United States Patent
Fakoorian et al.

(10) Patent No.: US 11,343,842 B2
(45) Date of Patent: May 24, 2022

(54) VALIDATING UPLINK CONFIGURED GRANTS

(71) Applicant: QUALCOMM Incorporated, San Diego, CA (US)

(72) Inventors: Seyed Ali Akbar Fakoorian, San Diego, CA (US); Wei Yang, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/830,068

(22) Filed: Mar. 25, 2020

(65) Prior Publication Data

US 2020/0322980 A1    Oct. 8, 2020

Related U.S. Application Data

(60) Provisional application No. 62/830,290, filed on Apr. 5, 2019.

(51) Int. Cl.
| | | |
|---|---|---|
| *H04W 72/14* | (2009.01) | |
| *H04W 72/10* | (2009.01) | |
| *H04L 1/18* | (2006.01) | |
| *H04W 76/11* | (2018.01) | |

(52) U.S. Cl.
CPC ........... *H04W 72/14* (2013.01); *H04L 1/1819* (2013.01); *H04W 72/10* (2013.01); *H04W 76/11* (2018.02)

(58) Field of Classification Search
CPC ............. H04W 72/1268–14; H04L 1/18–1896
See application file for complete search history.

(56) References Cited

U.S. PATENT DOCUMENTS

| | | | |
|---|---|---|---|
| 2018/0102915 A1 | 4/2018 | Rico Alvarino et al. | |
| 2020/0092905 A1* | 3/2020 | Vos | H04W 72/14 |
| 2020/0146045 A1* | 5/2020 | Loehr | H04L 1/1812 |

(Continued)

FOREIGN PATENT DOCUMENTS

| | | |
|---|---|---|
| WO | WO-2018204845 A1 | 11/2018 |
| WO | WO-2019030726 A1 | 2/2019 |

OTHER PUBLICATIONS

International Search Report and Written Opinion—PCT/US2020/025027—ISA/EPO—dated Sep. 1, 2020.

(Continued)

*Primary Examiner* — Marcus Smith
(74) *Attorney, Agent, or Firm* — Qualcomm Incorporated

(57) ABSTRACT

Methods, systems, and devices for wireless communications are described. Techniques are described herein for managing timers for hybrid automatic repeat request (HARQ) processes associated with multiple configured grants that are active at the same time. Techniques are also described herein for allocating HARQ identifiers (IDs) to HARQ processes associated with multiple configured grants that are active at the same time. A user equipment (UE) may configure timers to be associated with a HARQ ID and a configured grant. A base station or UE may include indicators of the configured grants associated with a HARQ process when exchanging signaling about the HARQ process. A UE may allocate HARQ IDs to multiple configured grants to reduce a likelihood that HARQ processes collide.

30 Claims, 16 Drawing Sheets

(56) References Cited

U.S. PATENT DOCUMENTS

2020/0154469 A1* 5/2020 Chin .................. H04L 1/18
2020/0296701 A1* 9/2020 Park .................. H04L 1/1896
2021/0014886 A1* 1/2021 Lee ................... H04W 80/02

OTHER PUBLICATIONS

Partial International Search Report—PCT/US2020/025027—ISA/EPO—dated Jul. 9, 2020.

* cited by examiner

VALIDATING UPLINK CONFIGURED GRANTS

CROSS REFERENCE

The present Application for Patent claims the benefit of U.S. Provisional Patent Application No. 62/830,290 by FAKOORIAN et al., entitled "VALIDATING UPLINK CONFIGURED GRANTS," filed Apr. 5, 2019, assigned to the assignee hereof, and expressly incorporated by reference in its entirety herein.

BACKGROUND

The following relates generally to wireless communications, and more specifically to validating uplink configured grants.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may use configured grants to allow a UE grantless-access to uplink resources. Uplink transmissions communicated using configured grants may use hybrid automatic repeat request (HARQ) processes to improve reliability.

SUMMARY

The described techniques relate to improved methods, systems, devices, and apparatuses that support validating uplink configured grants. Generally, the described techniques provide for managing timers for hybrid automatic repeat request (HARQ) processes associated with multiple configured grants that are active at the same time. Techniques are also described herein for allocating HARQ identifiers (IDs) to HARQ processes associated with multiple configured grants that are active at the same time. A user equipment (UE) may configure timers to be associated with a HARQ ID and a configured grant. A base station or UE may include indicators of the configured grants associated with a HARQ process when exchanging signaling about the HARQ process. A UE may allocate HARQ IDs to multiple configured grants to reduce a likelihood that HARQ processes collide.

A method of wireless communication is described. The method may include identifying a first configured grant actively used by a UE and a second configured grant actively used by the UE, identifying an uplink transmission occasion associated with the first configured grant, identifying a HARQ ID associated with the uplink transmission occasion and a timer associated with the HARQ ID, validating the uplink transmission occasion based on a status of the timer, and performing an uplink transmission during the uplink transmission occasion based on the validation.

An apparatus for wireless communication is described. The apparatus may include a processor, memory in electronic communication with the processor, and instructions stored in the memory. The instructions may be executable by the processor to cause the apparatus to identify a first configured grant actively used by a UE and a second configured grant actively used by the UE, identify an uplink transmission occasion associated with the first configured grant, identify a HARQ ID associated with the uplink transmission occasion and a timer associated with the HARQ ID, validate the uplink transmission occasion based on a status of the timer, and perform an uplink transmission during the uplink transmission occasion based on the validation.

Another apparatus for wireless communication is described. The apparatus may include means for identifying a first configured grant actively used by a UE and a second configured grant actively used by the UE, identifying an uplink transmission occasion associated with the first configured grant, identifying a HARQ ID associated with the uplink transmission occasion and a timer associated with the HARQ ID, validating the uplink transmission occasion based on a status of the timer, and performing an uplink transmission during the uplink transmission occasion based on the validation.

A non-transitory computer-readable medium storing code for wireless communication is described. The code may include instructions executable by a processor to identify a first configured grant actively used by a UE and a second configured grant actively used by the UE, identify an uplink transmission occasion associated with the first configured grant, identify a HARQ ID associated with the uplink transmission occasion and a timer associated with the HARQ ID, validate the uplink transmission occasion based on a status of the timer, and perform an uplink transmission during the uplink transmission occasion based on the validation.

Some examples of the method, apparatuses, and non-transitory computer-readable medium described herein may further include operations, features, means, or instructions for identifying the timer from a first set of timers associated with the first configured grant based on the uplink transmission occasion being associated with the first configured grant, where validating the uplink transmission occasion may be based on the timer being associated with a same configured grant as the uplink transmission occasion.

Some examples of the method, apparatuses, and non-transitory computer-readable medium described herein may further include operations, features, means, or instructions for configuring a first set of timers associated with the first configured grant and a second set of timers associated with the second configured grant based on identifying the first configured grant and the second configured grant, where the timer used to validate the uplink transmission occasion may be associated with a same configured grant as the uplink transmission occasion.

In some examples of the method, apparatuses, and non-transitory computer-readable medium described herein, the first set of timers includes two or more timers and the second set of timers includes two or more timers.

In some examples of the method, apparatuses, and non-transitory computer-readable medium described herein, the timer may be configured to validate uplink transmission occasions that may have the HARQ ID and that correspond to a same configured grant as may be associated with the timer.

Some examples of the method, apparatuses, and non-transitory computer-readable medium described herein may further include operations, features, means, or instructions for identifying the timer from a set of timers associated with the first configured grant and the second configured grant, where a single timer of the set of timers may be configured to track a HARQ process of a single HARQ ID associated with the first configured grant, the second configured grant, or both the first configured grant and the second configured grant.

In some examples of the method, apparatuses, and non-transitory computer-readable medium described herein, the timer may be associated with the single HARQ ID independent of whether the single HARQ ID may be associated with the first configured grant, the second configured grant, or both the first configured grant and the second configured grant.

Some examples of the method, apparatuses, and non-transitory computer-readable medium described herein may further include operations, features, means, or instructions for determining that a first service type of traffic communicated using the first configured grant may have a lower priority than a second service type of traffic communicated using the second configured grant, where validating the uplink transmission occasion may be based on determining that the first service type may have the lower priority than the second service type.

Some examples of the method, apparatuses, and non-transitory computer-readable medium described herein may further include operations, features, means, or instructions for determining that a second timer for the HARQ ID and associated with the second configured grant may be expired, where validating the uplink transmission occasion may be based on determining that the second timer may be expired.

In some examples of the method, apparatuses, and non-transitory computer-readable medium described herein, the timer may be associated with the first configured grant.

Some examples of the method, apparatuses, and non-transitory computer-readable medium described herein may further include operations, features, means, or instructions for performing a dynamic uplink transmission, where validating the uplink transmission occasion may be based on the timer being associated with the dynamic uplink transmission.

Some examples of the method, apparatuses, and non-transitory computer-readable medium described herein may further include operations, features, means, or instructions for determining that a first service type of traffic communicated using the first configured grant may have a higher priority than a second service type of traffic communicated using a dynamic grant, where validating the uplink transmission occasion further includes ignoring the timer associated with lower priority dynamic grant.

Some examples of the method, apparatuses, and non-transitory computer-readable medium described herein may further include operations, features, means, or instructions for identifying an error case based on determining that the first service type of the first configured grant may have the higher priority than the second service type of the dynamic grant.

Some examples of the method, apparatuses, and non-transitory computer-readable medium described herein may further include operations, features, means, or instructions for starting the timer associated with the HARQ ID based on performing the uplink transmission.

Some examples of the method, apparatuses, and non-transitory computer-readable medium described herein may further include operations, features, means, or instructions for receiving a first message including the first configured grant and the second configured grant, where identifying the first configured grant and the second configured grant may be based on receiving the first message.

In some examples of the method, apparatuses, and non-transitory computer-readable medium described herein, the first message includes a radio resource control message.

Some examples of the method, apparatuses, and non-transitory computer-readable medium described herein may further include operations, features, means, or instructions for determining that the uplink transmission may have a higher priority than traffic associated with the second configured grant, starting the timer associated with the HARQ ID and the first configured grant, and starting a second timer associated with the HARQ ID and the second configured grant.

In some examples of the method, apparatuses, and non-transitory computer-readable medium described herein, validating the uplink transmission occasion further may include operations, features, means, or instructions for determining that a value of the timer associated with the HARQ ID of the uplink transmission occasion satisfies a criteria.

In some examples of the method, apparatuses, and non-transitory computer-readable medium described herein, the value of the timer a zero value when the uplink transmission occasion may be validated.

Some examples of the method, apparatuses, and non-transitory computer-readable medium described herein may further include operations, features, means, or instructions for starting the timer based on performing a second uplink transmission as part of a HARQ process, monitoring for a dynamic grant from a base station until the timer expires, and determining that the second uplink transmission may be successfully received based on the timer expiring without receiving the dynamic grant.

Some examples of the method, apparatuses, and non-transitory computer-readable medium described herein may further include operations, features, means, or instructions for determining that the timer expires, and determining that a second uplink transmission may be successfully received by a base station based on determining that the timer expires, where validating the uplink transmission occasion may be based on determining that the timer expires.

Some examples of the method, apparatuses, and non-transitory computer-readable medium described herein may further include operations, features, means, or instructions for identifying three or more configured grants actively used by the UE, where the three or more configured grants include the first configured grant and the second configured grant.

In some examples of the method, apparatuses, and non-transitory computer-readable medium described herein, the first configured grant may be associated with a first configured scheduling radio network temporary identifier (CS-RNTI) and the second configured grant may be associated with a second CS-RNTI different than the first CS-RNTI.

Some examples of the method, apparatuses, and non-transitory computer-readable medium described herein may further include operations, features, means, or instructions for identifying a first symbol of the uplink transmission occasion, where identifying the HARQ ID associated with the uplink transmission occasion may be based on identifying the first symbol of the uplink transmission occasion.

A method of wireless communication is described. The method may include performing an uplink transmission associated with a configured grant and having a first HARQ ID, receiving, from a base station, a dynamic grant requesting that the uplink transmission be retransmitted as part of a HARQ process, the dynamic grant including a first indicator of the HARQ ID and a second indicator of the configured grant associated with the uplink transmission, and validating the dynamic grant based on the first indicator and the second indicator included in the dynamic grant.

An apparatus for wireless communication is described. The apparatus may include a processor, memory in electronic communication with the processor, and instructions stored in the memory. The instructions may be executable by the processor to cause the apparatus to perform an uplink transmission associated with a configured grant and having a first HARQ ID, receive, from a base station, a dynamic grant requesting that the uplink transmission be retransmitted as part of a HARQ process, the dynamic grant including a first indicator of the HARQ ID and a second indicator of the configured grant associated with the uplink transmission, and validate the dynamic grant based on the first indicator and the second indicator included in the dynamic grant.

Another apparatus for wireless communication is described. The apparatus may include means for performing an uplink transmission associated with a configured grant and having a first HARQ ID, receiving, from a base station, a dynamic grant requesting that the uplink transmission be retransmitted as part of a HARQ process, the dynamic grant including a first indicator of the HARQ ID and a second indicator of the configured grant associated with the uplink transmission, and validating the dynamic grant based on the first indicator and the second indicator included in the dynamic grant.

A non-transitory computer-readable medium storing code for wireless communication is described. The code may include instructions executable by a processor to perform an uplink transmission associated with a configured grant and having a first HARQ ID, receive, from a base station, a dynamic grant requesting that the uplink transmission be retransmitted as part of a HARQ process, the dynamic grant including a first indicator of the HARQ ID and a second indicator of the configured grant associated with the uplink transmission, and validate the dynamic grant based on the first indicator and the second indicator included in the dynamic grant.

Some examples of the method, apparatuses, and non-transitory computer-readable medium described herein may further include operations, features, means, or instructions for performing a retransmission of the uplink transmission based on validating the dynamic grant based at least in part on validating the dynamic grant, and restarting a timer based on performing the retransmission.

Some examples of the method, apparatuses, and non-transitory computer-readable medium described herein may further include operations, features, means, or instructions for identifying communication resources for retransmitting the uplink transmission based on receiving the dynamic grant, where performing the retransmission may be based on identifying the communication resources.

Some examples of the method, apparatuses, and non-transitory computer-readable medium described herein may further include operations, features, means, or instructions for discarding the dynamic grant based on the dynamic grant failing to be validated.

Some examples of the method, apparatuses, and non-transitory computer-readable medium described herein may further include operations, features, means, or instructions for downlinking control information includes the second indicator of the configured grant associated with the uplink transmission.

Some examples of the method, apparatuses, and non-transitory computer-readable medium described herein may further include operations, features, means, or instructions for downlinking control information includes a field that includes the second indicator.

A method of wireless communication is described. The method may include identifying a first quantity of uplink transmission occasions associated with a first configured grant and a second quantity of uplink transmission occasions associated with a second configured grant, determining that the first quantity associated with the first configured grant is greater than the second quantity associated with the second configured grant based on identifying the first quantity and the second quantity, allocating HARQ IDs to a first set of uplink transmission occasions associated with the first configured grant based on determining that the first quantity is greater than the second quantity, identifying a relationship parameter between the first set of uplink transmission occasions and a second set of uplink transmission occasions associated with the second configured grant, and allocating HARQ IDs to the second set of uplink transmission occasions based on the identified relationship parameter.

An apparatus for wireless communication is described. The apparatus may include a processor, memory in electronic communication with the processor, and instructions stored in the memory. The instructions may be executable by the processor to cause the apparatus to identify a first quantity of uplink transmission occasions associated with a first configured grant and a second quantity of uplink transmission occasions associated with a second configured grant, determine that the first quantity associated with the first configured grant is greater than the second quantity associated with the second configured grant based on identifying the first quantity and the second quantity, allocate HARQ IDs to a first set of uplink transmission occasions associated with the first configured grant based on determining that the first quantity is greater than the second quantity, identify a relationship parameter between the first set of uplink transmission occasions and a second set of uplink transmission occasions associated with the second configured grant, and allocate HARQ IDs to the second set of uplink transmission occasions based on the identified relationship parameter.

Another apparatus for wireless communication is described. The apparatus may include means for identifying a first quantity of uplink transmission occasions associated with a first configured grant and a second quantity of uplink transmission occasions associated with a second configured grant, determining that the first quantity associated with the first configured grant is greater than the second quantity associated with the second configured grant based on identifying the first quantity and the second quantity, allocating HARQ IDs to a first set of uplink transmission occasions associated with the first configured grant based on determining that the first quantity is greater than the second quantity, identifying a relationship parameter between the first set of uplink transmission occasions and a second set of uplink transmission occasions associated with the second configured grant, and allocating HARQ IDs to the second set of uplink transmission occasions based on the identified relationship parameter.

A non-transitory computer-readable medium storing code for wireless communication is described. The code may include instructions executable by a processor to identify a first quantity of uplink transmission occasions associated with a first configured grant and a second quantity of uplink transmission occasions associated with a second configured grant, determine that the first quantity associated with the first configured grant is greater than the second quantity associated with the second configured grant based on identifying the first quantity and the second quantity, allocate HARQ IDs to a first set of uplink transmission occasions associated with the first configured grant based on determining that the first quantity is greater than the second quantity, identify a relationship parameter between the first set of uplink transmission occasions and a second set of uplink transmission occasions associated with the second configured grant, and allocate HARQ IDs to the second set of uplink transmission occasions based on the identified relationship parameter.

In some examples of the method, apparatuses, and non-transitory computer-readable medium described herein, identifying the relationship parameter further may include operations, features, means, or instructions for determining that a first uplink transmission occasion of the second set overlaps in time resources with a second uplink transmission occasion of the first set, and identifying a first HARQ ID of the second uplink transmission occasion, where allocating the HARQ IDs to the second set further may include operations, features, means, or instructions for allocating the first HARQ ID to the first uplink transmission occasion based on determining that the second uplink transmission occasion overlaps with the first uplink transmission occasion.

In some examples of the method, apparatuses, and non-transitory computer-readable medium described herein, identifying the relationship parameter further may include operations, features, means, or instructions for identifying a periodic distance between a first uplink transmission occasion of the second set and each uplink transmission occasion of the first set, and identifying a first HARQ ID of a second uplink transmission occasion of the first set that may have a maximum periodic distance from the first uplink transmission occasion of the second set, where allocating the HARQ IDs to the second set further may include operations, features, means, or instructions for allocating the first HARQ ID to the first uplink transmission occasion based on first uplink transmission having the maximum periodic distance from the first uplink transmission occasion.

Some examples of the method, apparatuses, and non-transitory computer-readable medium described herein may further include operations, features, means, or instructions for determining that the first uplink transmission occasion of the second set does not overlap in time resources with the second uplink transmission occasion of the first set, where identifying the periodic distance may be based on determining that the first uplink transmission occasion does not overlap with the second uplink transmission occasion.

Some examples of the method, apparatuses, and non-transitory computer-readable medium described herein may further include operations, features, means, or instructions for identifying a minimum periodic distance between uplink transmission occasions having a same HARQ ID, and determining a timer duration based on the minimum periodic distance between the uplink transmission occasions having the same HARQ ID.

Some examples of the method, apparatuses, and non-transitory computer-readable medium described herein may further include operations, features, means, or instructions for identifying a first periodicity of the first set of uplink transmission occasions of the first configured grant and a second periodicity of the second set of uplink transmission occasions of the second configured grant, where allocating the HARQ IDs to the first set and the second set may be based on identifying the first periodicity and the second periodicity.

DETAILED DESCRIPTION

A wireless communication system may be configured to support more than one active configured grant at a time. A configured grant is an assignment of resources to a UE for data transmissions based on higher-layer signaling (e.g., radio resource control (RRC) layer signaling) without an associated grant over a physical downlink control channel. For example, a user equipment (UE) may be configured to communicate using any quantity of configured grants at the same time. When multiple configured grants are active at the same time it may result in the same hybrid automatic repeat request (HARQ) identifiers (IDs) being used across different configured grants. In addition, multiple configured grants being active at the same time may result in confusion about how to allocate configured grant timers. It may be desirable to implement procedures to allocate HARQ IDs and timers when multiple configured grants are active at the same time.

Techniques are described herein for managing timers for HARQ processes associated with multiple configured grants that are active at the same time. Techniques are also described herein for allocating HARQ IDs to HARQ processes associated with multiple configured grants that are active at the same time. A UE may configure timers to be associated with a HARQ ID and a configured grant. A base station or UE may include indicators of the configured grants associated with a HARQ process when exchanging signaling about the HARQ process. A UE may allocate HARQ IDs to multiple configured grants to reduce a likelihood that HARQ processes collide.

Aspects of the disclosure are initially described in the context of wireless communications systems. Aspects of the disclosure are described in the context of resource structures and messages structures. Aspects of the disclosure are further illustrated by and described with reference to apparatus diagrams, system diagrams, and flowcharts that relate to validating uplink configured grants.

Figure 1:
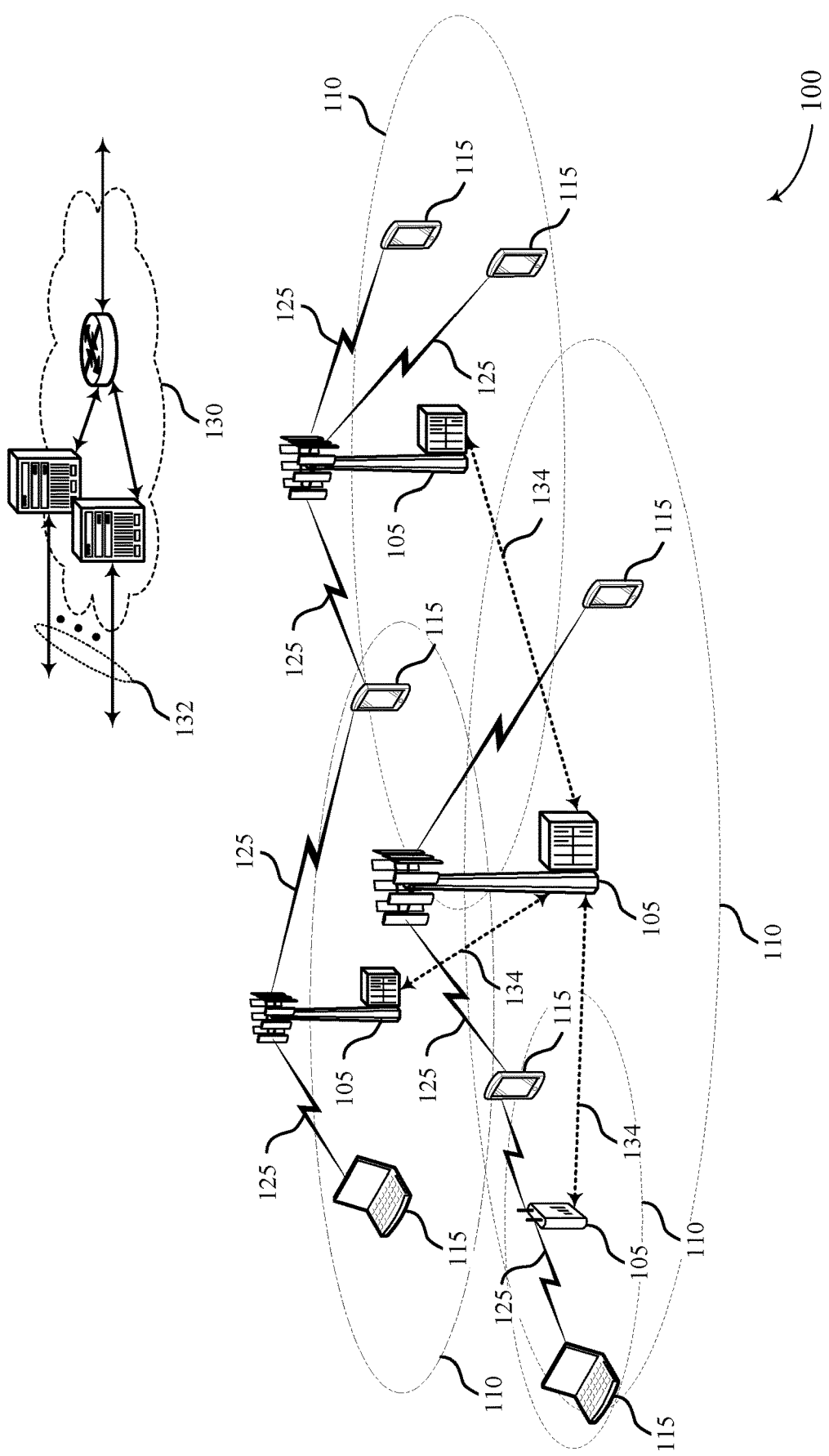
FIG. 1 illustrates an example of a system for wireless communications that supports validating uplink configured grants in accordance with aspects of the present disclosure.

FIG. 1 illustrates an example of a wireless communications system 100 that supports validating uplink configured grants in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for managing timers for HARQ processes associated with multiple configured grants that are active at the same time. Techniques are also described herein for allocating HARQ IDs to HARQ processes associated with multiple configured grants that are active at the same time. A UE 115 may configure timers to be associated with a HARQ ID and a configured grant. A base station 105 or UE 115 may include indicators of the configured grants associated with a HARQ process when exchanging signaling about the HARQ process. A UE 115 may allocate HARQ IDs to multiple configured grants to reduce a likelihood that HARQ processes collide.

Figure 2:
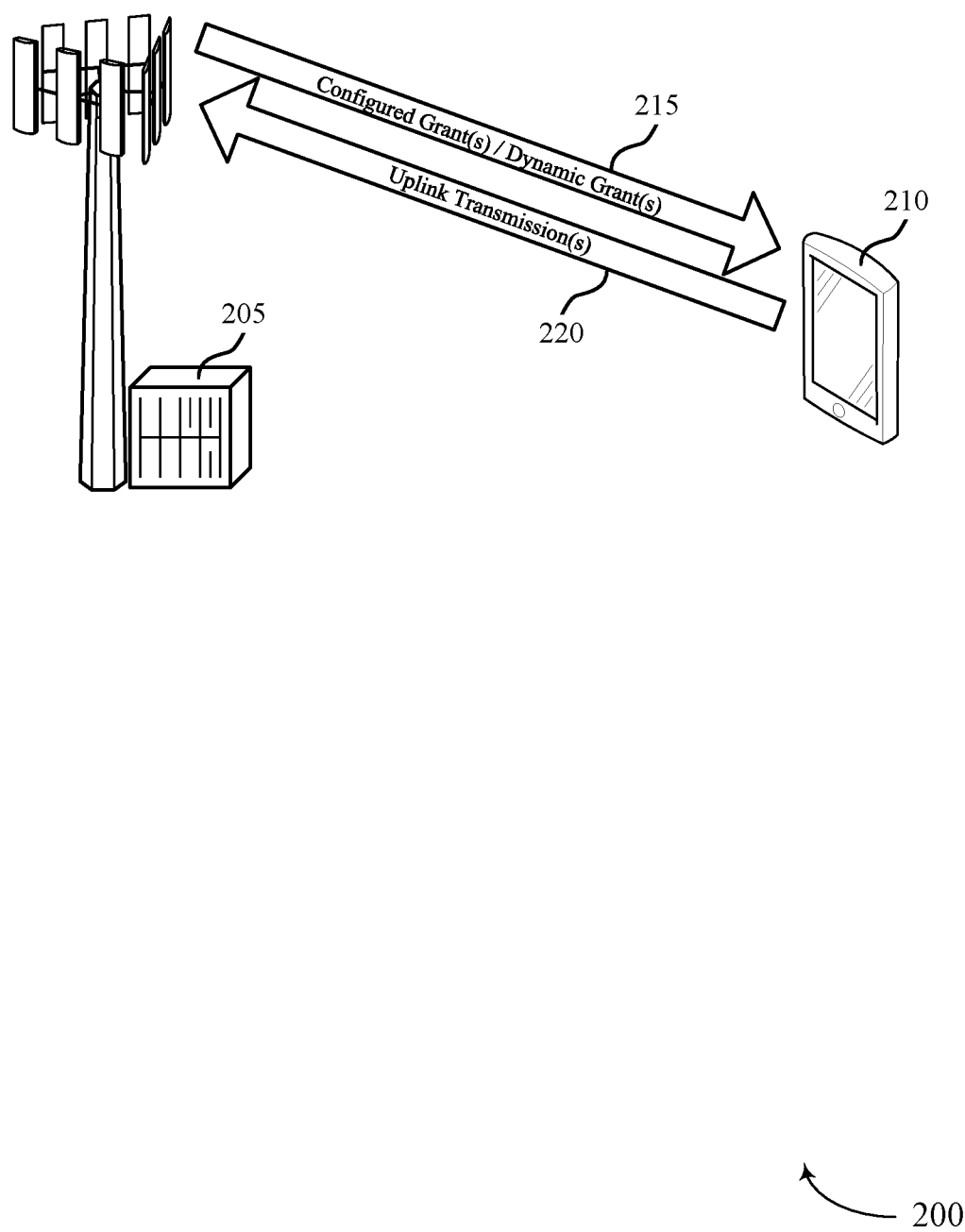
FIG. 2 illustrates an example of a wireless communication system that supports validating uplink configured grants in accordance with aspects of the present disclosure.

FIG. 2 illustrates an example of a wireless communication system 200 that supports validating uplink configured grants in accordance with aspects of the present disclosure. In some examples, the wireless communication system 200 may implement aspects of wireless communication system 100. The wireless communication system 200 may include a base station 205 and a UE 115. The base station 205 may be an example of a base station 105 described with reference to FIG. 1. The UE 210 may be an example of a UE 115 described with reference to FIG. 1.

The wireless communication system 200 may support both dynamic grants of uplink resources and configured grants of uplink resources. Dynamic grants may refer to allocations of uplink resources made by the base station 205 and then signaled to the UE 210 through messages sometimes referred to as dynamic grants. Configured grants may refer to allocations of uplink resources that are semi-persistently (or persistently) allocated to the UE 210. Configured grants may be shared by a plurality of UEs 210. Configured grants are configured to allow the UE 210 to transmit uplink messages without requesting a dynamic grant and then wait for the base station 205 to allocate resources via a dynamic grant. Configured grants may be used to communicate low-latency information such as ultra-reliable, low-latency communications (URLLCs).

The base station 205 may communicate information about dynamic grants or configured grants through one or more grant messages 215. The dynamic grant messages may be individual messages that allocate specific resources. The configured grant messages may be examples of RRC signaling that indicate the periodicity of uplink transmission occasions, HARQ processes, or other parameters associated with the configured grant. Once the UE 210 receives a configured grant message, the UE 210 may configure the periodic resources of the configured grant. The UE 210 may perform one or more uplink transmissions 220 using the uplink resources identified as part of a dynamic grant or a configured grant.

In some wireless communication systems, a UE 210 may be configured to support one configured grant at a time. In such wireless communication systems, the base station 205 and/or the UE 210 may be configured to determine HARQ IDs for each uplink transmission opportunity of the configured grant. For example, a wireless communication system may determine a HARQ ID for a specific uplink transmission opportunity based on Equation 1.

$$\text{HARQ ID} = \text{floor}(X/\text{UL,TWG,periodicity}) \bmod (\text{UL,TWG,numbHARQproc}) \quad (1)$$

X may refer to a symbol index of the current transmission occasion. In some cases, the symbol index may be associated with a first symbol of the current transmission occasion. In some cases, X may be determined using Equation 2.

$$X = \text{SFN}*\text{SlotPerFrame}*\text{SymbolPerSlot} + \text{Slot,index,ln,} \\ \text{SF}*\text{SymbolPerSlot} + \text{Slot,index,ln,SF} \quad (2)$$

The wireless communication system 200 may be configured to support and may include UEs 210 that are configured to support more than one active configured grant at a time. For example, a UE 210 may be configured to be communicating using a first configured grant and a second configured grant at the same time. The wireless communication system 200 and the UEs 210 may be configured to support any quantity of configured grants at the same time (e.g., two, three, four, five, six, seven, eight, and so on). For ease of description this disclosure focuses on two configured grants being active at the same time. The features described herein for two active configured grants may be applied or modified to work with three or more active configured grants.

When multiple configured grants are active at the same time it may result in the same HARQ IDs being used across different configured grants. In addition, multiple configured grants being active at the same time may result in confusion about how to allocate configured grant timers (hereinafter referred to as timers). It may be desirable to implement procedures to allocate HARQ IDs and timers when multiple configured grants are active at the same time.

Techniques are described herein for allocating HARQ IDs to HARQ processes associated with configured grants when multiple configured grants are active at the same time. Additionally or alternatively, techniques are described herein for configuring configured grant timers when multiple configured grants are active at the same time.

Figure 3:
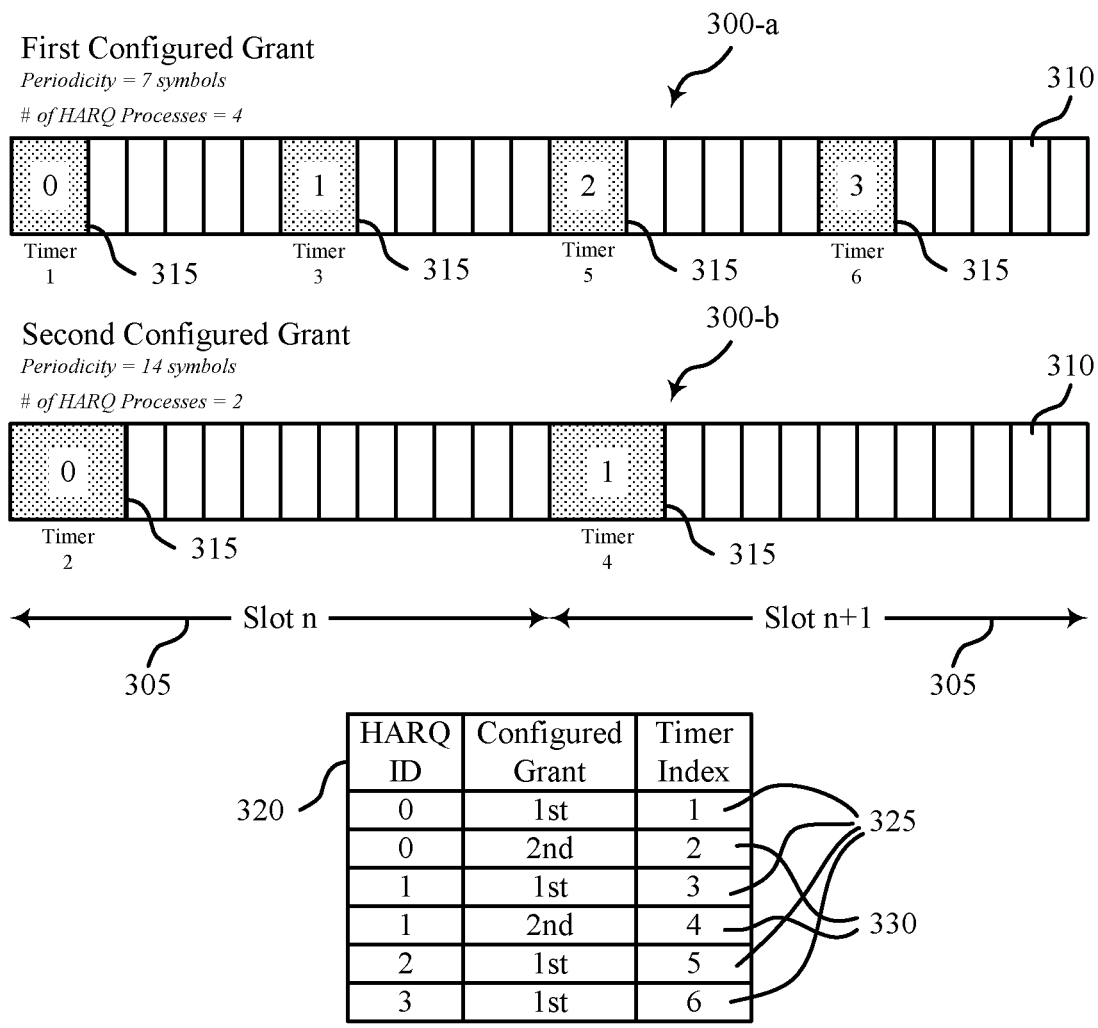
FIG. 3 illustrates examples of resource structures that support validating uplink configured grants in accordance with aspects of the present disclosure.

FIG. 3 illustrates examples of resource structures 300 that support validating uplink configured grants in accordance with aspects of the present disclosure. In some examples, the resource structures 300 may implement aspects of wireless communication systems 100 and 200.

The resource structures 300-a and 300-b illustrate resource allocations for a first configured grant and a second configured grant. In the resource structures 300-a and 300-b, the UE 210 configures a first set of timers for HARQ IDs of the first configured grant and a second set of timers for HARQ IDs of the second configured grant. With such configurations, a running timer for a first HARQ ID of the first configured grant does not invalidate transmission occasions for the first HARQ ID of the second configured grant. In this example, each HARQ ID in each configured grant is allocated its own timer.

The resource structures 300 for the first configured grant and the second configured grant may include a subframe, one or more slots 305, and one or more symbols 310. Uplink transmission occasions 315 may be configured periodically by a configured grant. Each uplink transmission occasion 315 may represent resources that the UE 210 can allocate to itself to perform an uplink transmission. Each uplink transmission occasion 315 may represent communication resources that the UE 210 does not have to request the base station 205 to allocate the uplink resources and does not have to wait for a grant of those resources from the base station 205. The UE 210 may unilaterally determine to use the resources of the uplink transmission occasion 315 of a configured grant without coordinating with the base station 205. Configured grants may be an example of grant-less access provided by the base station 205 to the UE 210. The base station 205 may coordinate with the UE 210 when the uplink transmission occasions 315, for any specific configured grant, may occur.

Different configured grants may have different parameters to meet different traffic needs. For example, the first configured grant may include four uplink transmission occasions 315 across a subframe. Each uplink transmission occasion 315 of the first configured grant may be two symbols in duration. Parameters for configuring the first configured grant may include a duration of each uplink transmission occasion, a periodicity of the uplink transmission occasions (e.g., seven symbols), a quantity of HARQ processes associated with the first configured grant, other parameters, or combinations thereof. In another example, the second configured grant may include two uplink transmission occasions 315 across a subframe. Each uplink transmission occasion 315 of the second configured grant may be three symbols in duration. Parameters for configuring the second configured grant may include a duration of each uplink transmission occasion, a periodicity of the uplink transmission occasions (e.g., seven symbols), a quantity of HARQ processes associated with the first configured grant, other parameters, or combinations thereof. The first configured grant and the second configured grant are provided for illustrative purposes. Other configured grants having other parameters not shown are also within the scope of this disclosure. In some cases, configured grants may be associated with traffic service types (e.g., URLLC or eMBB).

Uplink transmissions that occur during uplink transmission occasions 315 of configured grants may implement HARQ processes to ensure reliability. Because uplink transmissions in uplink transmission occasions 315 use resources not expressly allocated by the base station 205 (e.g., not allocated by a dynamic grant), the HARQ processes may work differently. For example, the HARQ processes associated with configured grants may not include the communication of acknowledgements (ACKs), but may include the communication of negative acknowledgements (NACKs).

For a HARQ process associated with a configured grant, the UE 210 may perform an uplink transmission using the resources of an uplink transmission occasion 315. Upon performing the uplink transmission, the UE 210 may start a timer associated with the HARQ ID of the uplink transmission occasion 315. If the timer expires before the UE 210 receives a dynamic grant requesting retransmission of the uplink transmission (e.g., a NACK associated with the HARQ ID), the UE 210 may assume the uplink transmission was successfully received by the base station 205 and may resolve the HARQ process. If the UE 210 receives a dynamic grant requesting retransmission of the uplink transmission (e.g., a NACK associated with the HARQ ID) before the timer expires, the UE 210 may proceed with retransmitting the uplink transmission and restarting the timer for the HARQ ID. Examples of the timer expiring may include a value of the timer satisfying a criteria or a value of the timer being a zero value.

Before performing an uplink transmission, the UE 210 may validate an uplink transmission occasion 315 to determine if its HARQ process is available for use. In a configured grant, the periodic uplink transmission occasions may be associated with specific HARQ IDs in a static or semi-static manner. When a HARQ process is already running (e.g., the timer associated with the HARQ process is running), the UE 210 may not be permitted to perform an uplink transmission using that same HARQ ID because using the same HARQ ID may make both HARQ processes fail. For example, if the UE 210 receives a NACK for the HARQ ID, the UE 210 may not know with which uplink transmission the NACK is associated. To prevent such scenarios, the UE 210 may first validate an uplink transmission occasion 315 before transmitting using the resources of the uplink transmission occasion. For example, when validating an uplink transmission occasion, the UE 210 may determine whether a timer associated with the HARQ ID is running (e.g., is a non-zero value) or may determine whether a HARQ process is active using some other procedures.

The dynamic grant received from the base station 205 may indicate that a HARQ transmission (e.g., an uplink transmission associated with the HARQ ID) is to be retransmitted and may allocate resources for such a retransmission. In such cases, a HARQ ID that is initially associated with a configured grant may become associated with a dynamic grant as the HARQ process proceeds. The dynamic grant may be an example of a NACK in a HARQ process. The dynamic grant may include the HARQ ID or may include an indicator of the HARQ ID. In some cases, as described with more detail herein, the dynamic grant may include an indicator of the configured grant associated with the HARQ ID.

As illustrated in table 320, the UE 210 may configure timers for tracking whether NACKs are received as part of a HARQ process. In the example of table 320, the UE 210 configures a timer for each uplink transmission occasion 315 in each configured grant. Such a configuration may result in multiple timers being associated with a single HARQ ID. For example, if a first HARQ ID is associated with a first uplink transmission occasion of the first configured grant and the same first HARQ ID is associated with a first uplink transmission occasion of the second configured grant, two timers may be configured: a first timer for the first uplink transmission occasion of the first configured grant; and a second timer for the first uplink transmission occasion of the second configured grant. In such examples, a running timer for HARQ ID #1 at the first configured grant does not invalidate an uplink transmission occasion for HARQ ID #1 at the second configured grant.

The timers for HARQ processes may be indexed based on HARQ IDs and the associated configured grants. When configuring the timers, the UE 210 may use the configured grant or an identifier of the configured grant. In some cases, using the configured grant to configure timers may be a departure from previous techniques that did not take the configured grants into account when configuring the timers.

The UE 210 may configure a first set 325 of timers for uplink transmission occasions associated with the first configured grant and may configure a second set 330 of timers for uplink transmission occasions associated with the second configured grant. As shown in the example of table 320, the first set 325 of timers may include the timers with the index values of 1, 3, 5, and 6 and the second set of timers may include the timers with the index values of 2 and 4.

In some cases, the UE 210 may receive a dynamic grant and may perform an uplink transmission (e.g., a dynamic physical uplink shared channel (PUSCH) transmission) associated with a HARQ ID based on receiving the dynamic grant. In such cases, the timer of the HARQ ID may be running based on a dynamic uplink transmission rather than a configured grant uplink transmission. In such cases, the UE 210 may be configured to restart each timer associated with that HARQ ID. For example, if the dynamic uplink transmission is associated with HARQ ID #1, the UE 210 may start or restart timer index #3 associated with the first configured grant and timer index #4 associated with the second configured grant.

Figure 4:
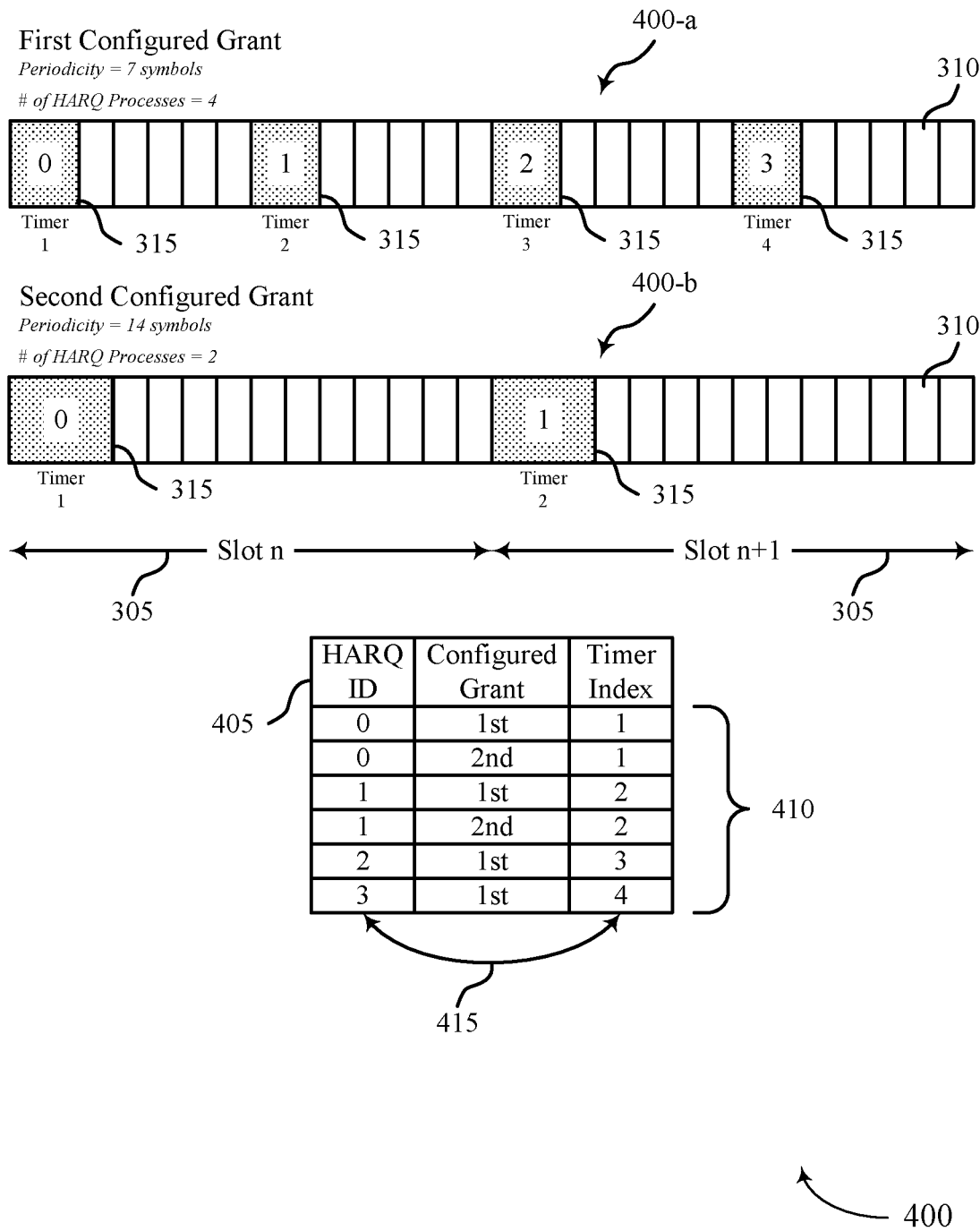
FIG. 4 illustrates examples of resource structures that support validating uplink configured grants in accordance with aspects of the present disclosure.

FIG. 4 illustrates examples of resource structures 400 that support validating uplink configured grants in accordance with aspects of the present disclosure. In some examples, the resource structures 400 may implement aspects of wireless communication systems 100 and 200. The resource structures 400 represent similar features as the resource structures 300 described with reference to FIG. 3. As such, elements with similar names or numbers may be embodied similarly.

The resource structures 400-*a* and 400-*b* illustrate resource allocations for a first configured grant and a second configured grant. In the resource structures 400-*a* and 400-*b*, the UE 210 configures a single set 410 of timers for HARQ IDs. In the resource structures 400-*a* and 400-*b*, a timer is configured on a per-HARQ ID basis without regard to the configured grant. In such configurations, a single timer may be associated with a HARQ process in the first configured grant and the second configured grant. Such situations may cause some uplink transmission occasions 315 of one configured grant to not be validated because of uplink transmissions made using another configured grant. The HARQ processes associated with the first configured grant and the second configured grant shown in resource structures 400 may be similar to the HARQ processes described with reference to FIG. 3, but may be different in regards to the configuration or functions of the timers.

As illustrated in table 405, the UE 210 may configure timers for tracking whether NACKs are received as part of HARQ processes. In the examples of table 405, the UE 210 configures a single timer for each HARQ ID associated with uplink transmission occasions 315. Unlike the timers described with reference to FIG. 3, these timers are not associated with any specific configured grant and may be agnostic to the existence of different active configured grants. Such a configuration may result in a single timer being associated with a single HARQ ID regardless of how many configured grants are using a specific HARQ ID. Relationship 415 shows a one-to-one mapping between timer indexes and HARQ IDs. In such configurations of timers, a running timer for HARQ ID #1 at the first configured grant may be used to invalidate an uplink transmission occasion for HARQ ID #1 at the second configured grant.

Before performing an uplink transmission, the UE 210 may validate an uplink transmission occasion 315 to determine if its HARQ process is available for use. In a configured grant, the periodic uplink transmission occasions may be associated with specific HARQ IDs in a static or semi-static manner. To prevent failure of a HARQ process, the UE 210 may first validate an uplink transmission occasion 315 with a first HARQ ID before transmitting using the resources of the uplink transmission occasion or the HARQ ID. For example, when validating an uplink transmission occasion, the UE 210 may determine whether a timer associated with the HARQ ID is running (e.g., is a non-zero value) or may determine whether a HARQ process is active using some other procedures.

When validating the uplink transmission occasion 315, the UE 210 may identify the HARQ ID of the uplink transmission occasion 315 and may identify the timer associated with the HARQ ID. If the timer is running (e.g., active), the UE 210 may invalidate the uplink transmission occasion, regardless of whether the timer is running, because of an uplink transmission using the first configured grant or using the second configured grant.

In some cases, the UE 210 may receive a dynamic grant and may perform an uplink transmission (e.g., a dynamic PUSCH transmission) associated with a HARQ ID based on receiving the dynamic grant. In such cases, the timer of the HARQ ID may be running based on a dynamic uplink transmission rather than a configured grant uplink transmission. In such cases, the UE 210 may be configured to restart each timer associated with that HARQ ID. For example, if the dynamic uplink transmission is associated with HARQ ID #1, the UE 210 may start or restart timer index #2 associated with both the first configured grant and the second configured grant.

Figure 5:
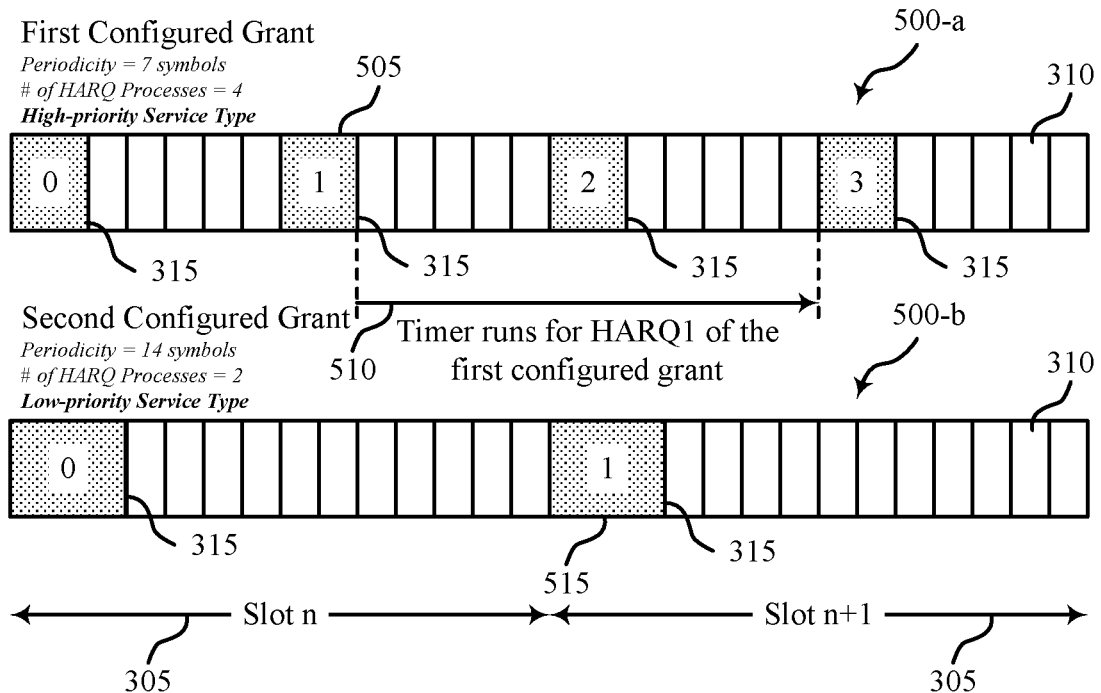
FIG. 5 illustrates examples of resource structures that support validating uplink configured grants in accordance with aspects of the present disclosure.

FIG. 5 illustrates examples of resource structures 500 that support validating uplink configured grants in accordance with aspects of the present disclosure. In some examples, the resource structures 500 may implement aspects of wireless communication systems 100 and 200. The resource structures 500 represent similar features as the resource structures 300 or 400 described with reference to FIGS. 3 and 4. As such, elements with similar names or numbers may be embodied similarly. The HARQ processes associated with the first configured grant and the second configured grant shown in resource structures 500 may be similar to the HARQ processes described with reference to FIG. 3 or 4.

The resource structures 500-*a* and 500-*b* illustrate resource allocations for a first configured grant and a second configured grant. The first configured grant and the second configured grant may be associated with traffic of different priorities. For example, the first configured grant may be associated with traffic of a first service type (e.g., URLLC) that has a higher priority than traffic of a second service type (e.g., eMBB) that is associated with the second configured grant. The description of resource structures 500-*a* and 500-*b* illustrate procedures related to validation of uplink transmission occasions 315 that are related to checking service types or priority of traffic for configured grants. The resource structures 500-*a* and 500-*b* and the associated procedures for service types may utilize the timer configuration represented in table 320 described with reference to FIG. 3, or the timer configuration represented in table 405 described with reference to FIG. 4, or a combination thereof.

In some cases, a higher-priority configured grant may be configured to ignore a running timer associated with a lower-priority configured grant. In some cases, however, a lower-priority configured grant may not be configured to ignore a running timer associated with a higher-priority configured grant. In other cases, the reverse may be true or any combination of these rules.

In some examples that utilize the timer configuration described with reference to FIG. 3, the UE 210 may perform an uplink transmission using the resources of an uplink transmission occasion 505 of the first configured grant. The uplink transmission occasion 505 may be associated with a first HARQ ID. The first configured grant may be associated with lower-priority traffic than the second configured grant. The UE 210, upon performing the uplink transmission may start the timer 510 associated with the first HARQ ID. At a later timer, the UE 210 may attempt to validate an uplink transmission occasion 515 of the second configured grant, where the uplink transmission occasion 515 has the first HARQ ID (e.g., the same HARQ ID as the uplink transmission occasion 505).

When validating the uplink transmission occasion 515, the UE 210 may determine whether a first timer associated with the uplink transmission occasion 515 is running, determine whether the timer 510 associated with the uplink transmission occasion 505 is running, or a combination thereof. In some cases, the UE 210 may identify the configured grant associated with the uplink transmission occasion 515 (e.g., the first configured grant) and may identify the service type associated with the first configured grant. The UE 210 may compare the service type of the first configured grant with service types of other active configured grants and determine whether any other configured grants have traffic of a higher-priority than the first configured grant. For configured grants having traffic of a higher priority, the UE 210 may determine whether timers associated with the first HARQ ID are running. If any of the timers of the first HARQ ID in any of the higher-priority configured grants are running, the UE 210 may invalidate the uplink transmission occasion 515 of the first configured grant.

In some cases, a lower-priority configured grant is allowed for transmission using a same HARQ ID if a timer of a higher-priority configured grant is expired. In some cases, a lower-priority configured grant is allowed for transmission using a same HARQ ID if a timer of a higher-priority configured grant is expired and a timer of the lower-priority configured grant is also expired. In such cases, the UE 210 may implement multi-state timer tracking.

In some cases, the UE 210 may receive a dynamic grant and may perform an uplink transmission (e.g., a dynamic PUSCH transmission) associated with a HARQ ID based on receiving the dynamic grant. In such cases, the timer of the HARQ ID may be running based on a dynamic grant uplink transmission rather than a configured grant uplink transmission. In such cases, the UE 210 may be configured to restart each timer associated with that HARQ ID. For example, if the dynamic uplink transmission is associated with HARQ ID #1 and is high priority, the UE 210 may start or restart the timer of the HARQ ID #1 associated with each configured grant having the same or lower priority than the dynamic uplink transmission.

In some wireless communication systems, a dynamic uplink transmission with C-RNTI (e.g., scheduled by a dynamic grant) may be configured to overwrite or take priority over an uplink transmission with CS-RNTI (e.g., scheduled by a configured grant). In such cases, a timer of a first HARQ ID associated with a configured grant is started or restarted based on performing the dynamic uplink transmission with the same first HARQ ID.

In wireless communication systems with multiple active configured grants and where the configured grants are associated with different traffic of different priorities, the relationship between dynamic uplink transmissions and configured uplink transmissions may be adjusted. In some cases, the UE 210 may use the priority of the uplink transmission occasions to determine which uplink transmission (whether dynamic or configured) gets to overwrite the other uplink transmission. For example, an uplink transmission scheduled by a configured grant that has a higher priority than a dynamic uplink transmission may get priority over the dynamic uplink transmission and may overwrite the dynamic uplink transmission. If the dynamic uplink transmission has the same or a higher priority than the uplink transmission scheduled by the configured grant, the dynamic uplink transmission may get priority or may overwrite the uplink transmission. In some cases, the UE 210 may ignore a running timer that was started or restarted due to a dynamic uplink transmission that has a lower priority than the uplink transmission occasion being validated. In some cases, the UE 210 may identify an error case when such types of collisions occur.

Figure 6:
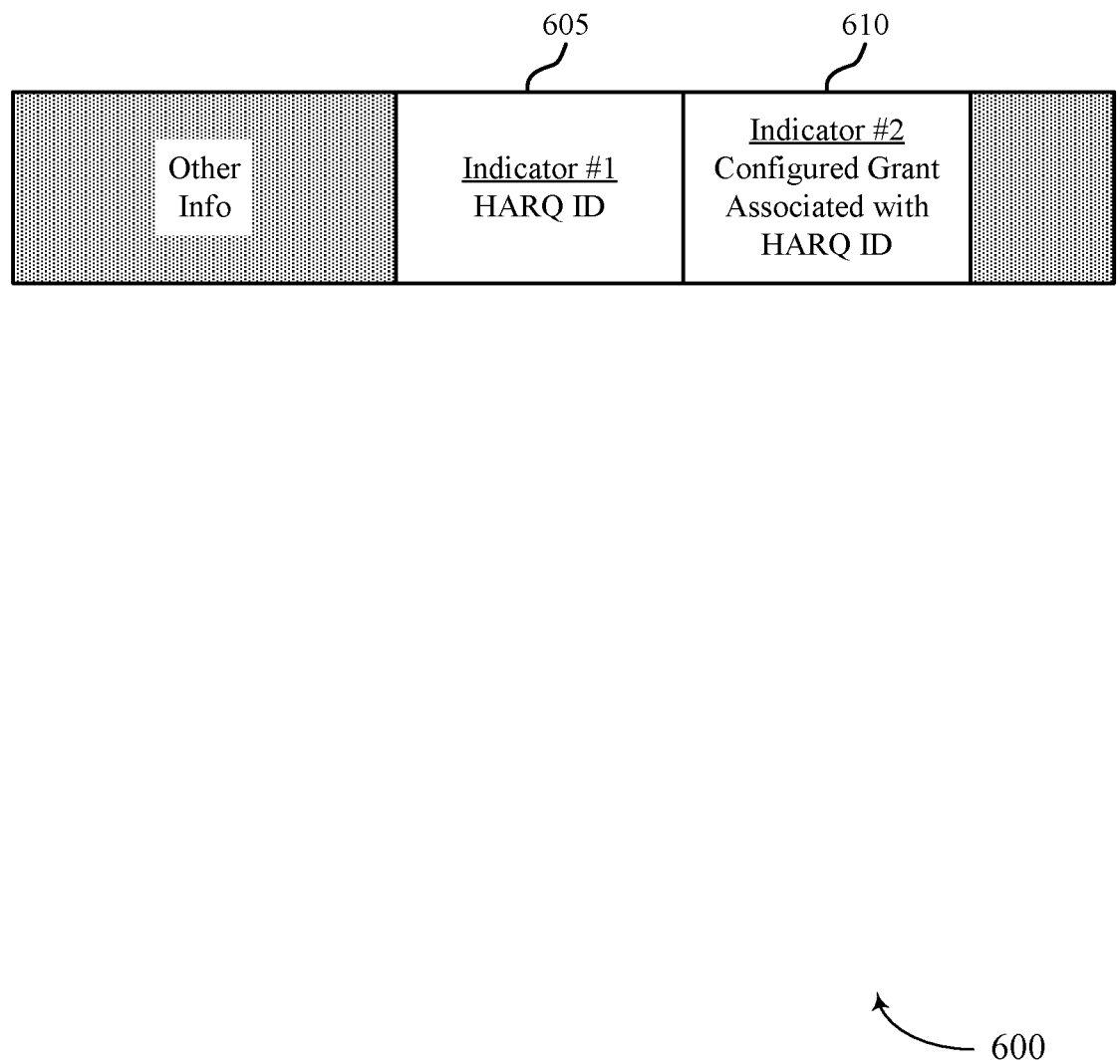
FIG. 6 illustrates an example of a message structure that supports validating uplink configured grants in accordance with aspects of the present disclosure.

FIG. 6 illustrates an example of a message structure 600 that supports validating uplink configured grants in accordance with aspects of the present disclosure. In some examples, the message structure 600 may implement aspects of wireless communication systems 100 and 200.

The messages structure 600 illustrates examples of how HARQ IDs may be allocated in a multi-configured grant environment to mitigate issues related to configured grant timers (e.g., to mitigate some of the issues described above). The features of allocating HARQ IDs may be combined with any of the features described with reference to FIGS. 3-5.

In some cases, disjoint HARQ IDs may be split to different configured grant configurations. Such cases may reduce some transmission flexibility or may increase a latency of communications. In some cases, all of the active configured grants may be considered when determining HARQ IDs and HARQ IDs may be assigned based on the total collection of configured grants and not just on single configured grant.

In some cases, the UE 210 may associate each active configured grant with a different CS-RNTI. In such cases, the decoding complexity may be increased. The different CS-RNTIs for the different configured grants may be communicated using RRC signaling.

The message structure 600 illustrates how a message may indicate a HARQ ID and configured grant associated with a HARQ process, a retransmission request, or other information. After making an uplink transmission, a base station 205 may attempt to decode the uplink transmission. If decoding fails, the base station 205 may transmit a dynamic grant or other message to request retransmission of the uplink transmission. The dynamic grant or other message may include an indicator 605 the HARQ ID of the retransmission being requested. In some cases, the dynamic grant or other message may include an indicator 610 of the configured grant associated with the retransmission being requested. In some cases, the indicator 610 may include an index of the configured grant associated with the requested retransmission. In situations where there are multiple active configured grants, the UE 210 may use the indicator 610 to distinguish between uplink transmission that have the same HARQ ID. The dynamic grant or the other message may include other information as well.

The indicators 605 and 610 may be examples of information included in downlink control information. The downlink control information may be associated with a CS-RNTI and may (implicitly or explicitly) indicate an index of the configured grant associated with the HARQ ID and the uplink transmission. The indicators 605 and 610 may be examples of fields of the message. In some cases, the indicator 610 may include one or more bits to distinguish between two or active configured grants. In other implementations, the information of indicators 605 and 610 may be implicitly signaled and may be derived from other information in the dynamic grant or other message.

The UE 210 may determine whether the received HARQ ID and the received configured grant index matches what the UE 210 transmitted. If HARQ ID and the index do not match, the UE 210 may determine that the base station 205 detected the wrong configured grant index/HARQ process. In such cases, the UE 210 may discard the retransmission grant, and optionally retransmit the transport block in another new configured grant occasion.

Figure 7A:
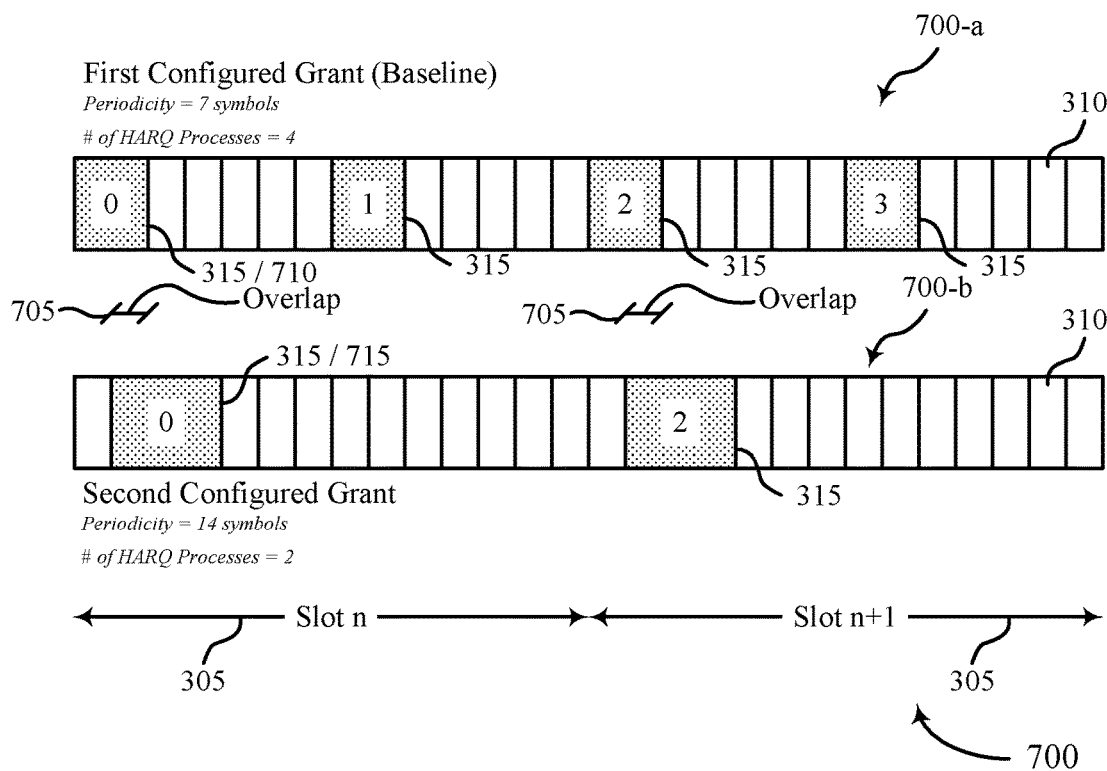
FIGS. 7A and 7B illustrate examples of resource structures that support validating uplink configured grants in accordance with aspects of the present disclosure.
Figure 7B:
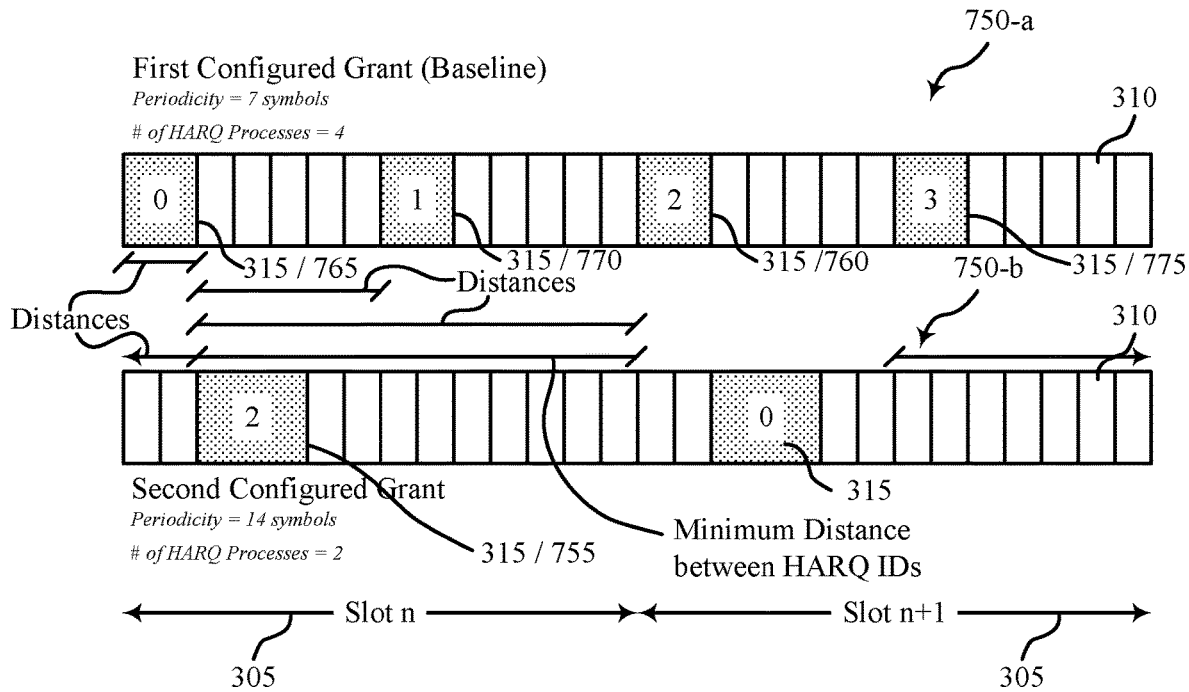

FIGS. 7A and 7B illustrate examples of resource structures that support validating uplink configured grants in accordance with aspects of the present disclosure. Specifically, FIGS. 7A and 7B illustrate how HARQ IDs may be allocated between different active configured grants. At least two examples are described. In a first example, HARQ IDs are allocated based on uplink transmission occasions overlapping in time resources. In a second example, HARQ IDs are allocated based on using larger periodic distances between uplink transmission occasions sharing the same HARQ ID.

FIG. 7A illustrates examples of resource structures 700 that support validating uplink configured grants in accordance with aspects of the present disclosure. In some examples, the resource structures 700 may implement aspects of wireless communication systems 100 and 200. The resource structures 700-a and 700-b represent similar features as the resource structures 300, 400, or 500 described with reference to FIGS. 3-5. As such, elements with similar names or numbers may be embodied similarly. The HARQ processes associated with the first configured grant and the second configured grant shown in resource structures 700 may be similar to the HARQ processes described with reference to FIGS. 3-6.

The resource structures 700-a and 700-b illustrate procedures for allocating HARQ IDs when multiple configured grants are active. The functions of allocating HARQ IDs may be performed by a UE 210 or a base station 205, but are described in the context of a UE 210 for ease of description.

When allocating HARQ IDs, the UE 210 may determine that more than one configured grants are active at the same time. The UE 210 may identify the quantities of uplink transmission occasions associated with each configured grant. In some cases, to do this, the UE 210 may identify a maximum quantity of HARQ processes associated with each configured grant. The UE 210 may select the configured grant with the largest quantity of uplink transmission occasions or the largest quantity of HARQ processes as a baseline configured grant. The UE 210 may allocate HARQ IDs to the baseline configured grant using one or more standard methods (e.g., Equations 1 and 2 described herein).

The UE 210 may allocate HARQ IDs to uplink transmission occasions based on a variety of different processes. The UE 210 may determine a relationship or a relationship parameter between uplink transmission occasions of the baseline configured grant and other configured grants. In some cases, the relationship or relationship parameter may relate to the uplink transmission occasions overlapping over the same time resources, or may relate to the periodic distances between uplink transmission occasions, or a combination thereof. In some examples, the UE 210 may determine whether any of the uplink transmission occasions of the other configured grants overlap 705 with the uplink transmission occasions of the baseline configured grant (e.g., the first configured grant). For uplink transmission occasions that overlap with the baseline configured grant, the UE 210 may assign the same HARQ ID to the uplink transmission occasion as is assigned to the overlapping uplink transmission occasion of the baseline configured grant.

For example, if the uplink transmission occasion 710 of the baseline configured grant overlaps with the uplink transmission occasion 715 of the second configured grant, the UE 210 may assign the uplink transmission occasion 715 with the same HARQ ID as the uplink transmission occasion 710. Such a configuration may reduce situations where a transmission occasion in a second configured grant is invalidated based on an uplink transmission of a first configured grant. A UE 210 may not be configured to transmit uplink transmissions using two configured grants concurrently. Rather, for a given symbol, the UE 210 may select to use the first active configured grant or the second configured grant. Assigning overlapping uplink transmission occasions to the same HARQ IDs may mitigate or reduce the likelihood of HARQ processes conflicting with each other across multiple configured grants.

FIG. 7B illustrates examples of resource structures 750 that support validating uplink configured grants in accordance with aspects of the present disclosure. In some examples, the resource structures 750 may implement aspects of wireless communication systems 100 and 200. The resource structures 750-a and 750-b represent similar features as the resource structures 300, 400, or 500 described with reference to FIGS. 3-5. As such, elements with similar names or numbers may be embodied similarly. The HARQ processes associated with the first configured grant and the second configured grant shown in resource structures 700 may be similar to the HARQ processes described with reference to FIGS. 3-6.

The resource structures 750-a and 750-b illustrate procedures for allocating HARQ IDs when multiple configured grants are active. Specifically, the resource structures 750-a and 750-b illustrate an example of using periodic distances between uplink transmission occasions to allocate HARQ IDs. The functions of allocating HARQ IDs may be performed by a UE 210 or a base station 205, but are described in the context of a UE 210 for ease of description.

When allocating HARQ IDs, the UE 210 may determine that more than one configured grants are active at the same time. The UE 210 may identify the quantities of uplink transmission occasions associated with each configured grant. In some cases, to do this, the UE 210 may identify a maximum quantity of HARQ processes associated with each configured grant. The UE 210 may select the configured grant with the largest quantity of uplink transmission occasions or the largest quantity of HARQ processes as a baseline configured grant. The UE 210 may allocate HARQ IDs to the baseline configured grant using one or more standard methods (e.g., Equations 1 and 2 described herein).

The UE 210 may allocate HARQ IDs to uplink transmission occasions based on a variety of different processes. The UE 210 may determine a relationship or a relationship parameter between uplink transmission occasions of the baseline configured grant and other configured grants. In some cases, the relationship or relationship parameter may relate to the uplink transmission occasions overlapping over the same time resources, or may relate to the periodic distances between uplink transmission occasions, or a combination thereof. In some examples, the UE 210 may determine the periodic distances between uplink transmission occasions and allocated HARQ IDs based on those distances. In some examples, the UE 210 may assign HARQ IDs across different configured grants that are maximally separated.

For example, when assigning a HARQ ID to uplink transmission occasion 755 of the second configured grant, the UE 210 may determine the distances between the uplink transmission occasion 755 and other uplink transmission occasions of the baseline configured grant. The UE 210 may identify that the uplink transmission occasion 760 of the baseline grant has the greatest periodic distance from the uplink transmission occasion 755. In this example, the uplink transmission occasion 755 is separated from first transmission occasion 765 by up to two symbols, a second transmission occasion 770 by up to five symbols, a third transmission occasion 775 by up to nine symbols, and the uplink transmission occasion 760 by up to twelve symbols.

In some cases, the UE 210 may determine a maximum timer duration based on the distances between transmission occasions across configured grants that have the same HARQ IDs. The UE 210 may identify a minimum distance between transmission occasions that have the same HARQ ID. The UE 210 may set the maximum timer duration to be less than or equal to the identified minimum distance. The base station 205 may be configured to process and decode the uplink transmission (e.g., a PUSCH transmission) and schedule a retransmission in a time that is less than the maximum timer duration.

In some implementations, the UE 210 may allocate HARQ IDs using a combination of both overlapping procedures described with reference to FIG. 7A and the distance procedures described with reference to FIG. 7B. For example, the UE 210 may first determine whether uplink transmission occasions overlap and may allocate HARQ IDs based on the overlapping. If an uplink transmission occasion of a second configured grant does not overlap with an uplink transmission occasion of the baseline configured grant, the UE 210 may allocate the HARQ ID to the uplink transmission of the second configured grant based on which HARQ ID of the baseline configured grant is maximally separated from it.

Figure 8:
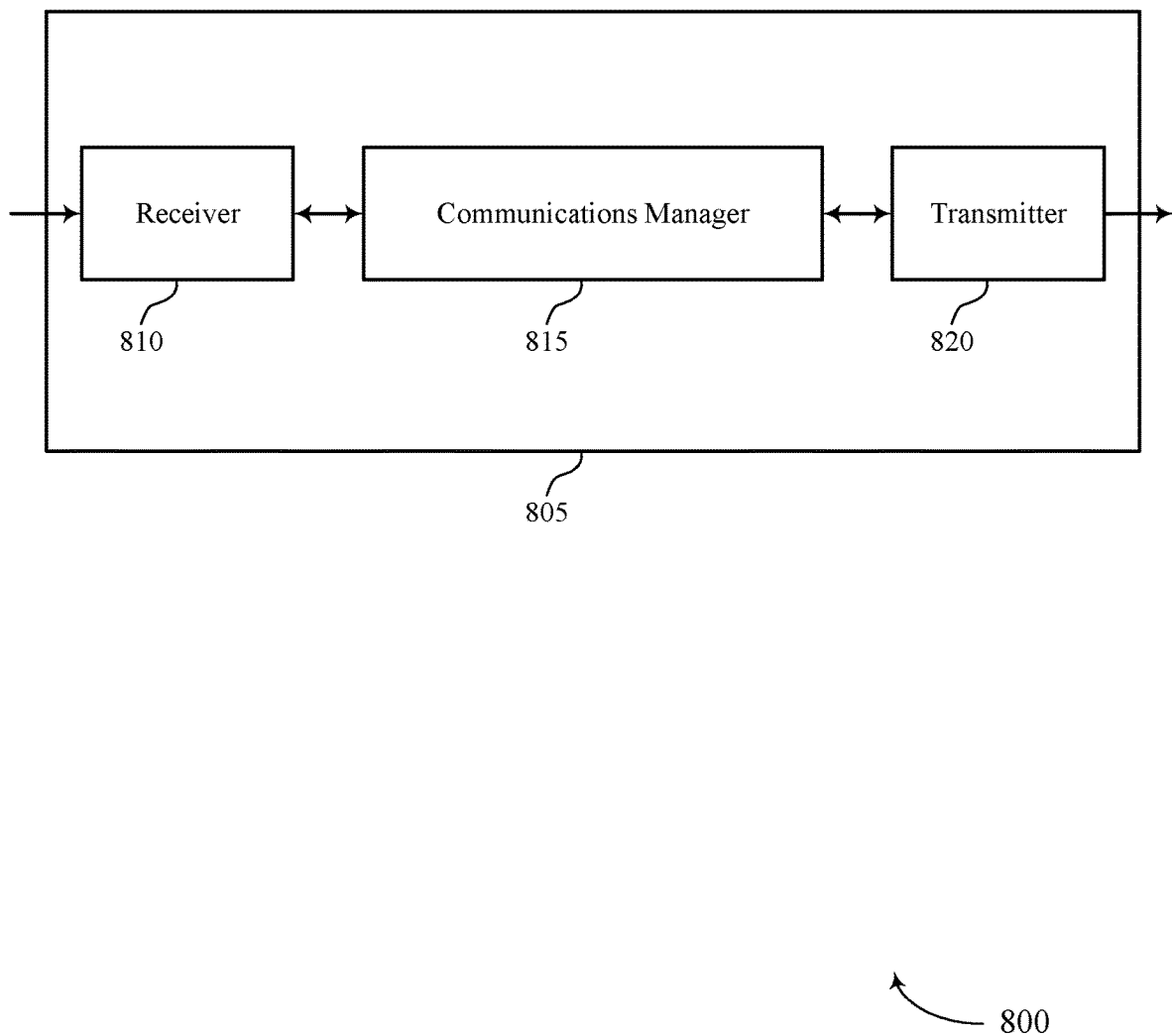
FIGS. 8 and 9 show block diagrams of devices that support validating uplink configured grants in accordance with aspects of the present disclosure.

FIG. 8 shows a block diagram 800 of a device 805 that supports validating uplink configured grants in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to validating uplink configured grants). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first configured grant actively used by a UE and a second configured grant actively used by the UE, identify an uplink transmission occasion associated with the first configured grant, perform an uplink transmission during the uplink transmission occasion based on the validation, identify a HARQ ID associated with the uplink transmission occasion and a timer associated with the HARQ ID, and validate the uplink transmission occasion based on a status of the timer. The communications manager 815 may also perform an uplink transmission associated with a configured grant and having a first HARQ ID, receive, from a base station, a dynamic grant requesting that the uplink transmission be retransmitted as part of a HARQ process, the dynamic grant including a first indicator of the HARQ ID and a second indicator of the configured grant associated with the uplink transmission, and validate the dynamic grant based on the first indicator and the second indicator included in the dynamic grant.

The communications manager 815 may also identify a first quantity of uplink transmission occasions associated with a first configured grant and a second quantity of uplink transmission occasions associated with a second configured grant, determine that the first quantity associated with the first configured grant is greater than the second quantity associated with the second configured grant based on identifying the first quantity and the second quantity, allocate HARQ IDs to a first set of uplink transmission occasions associated with the first configured grant based on determining that the first quantity is greater than the second quantity, identify a relationship parameter between the first set of uplink transmission occasions and a second set of uplink transmission occasions associated with the second configured grant, and allocate HARQ IDs to the second set of uplink transmission occasions based on the identified relationship parameter. The actions performed by the communications manager 815 as described herein may be implemented to realize one or more potential advantages. One implementation may allow a UE 210 to decrease latency by reducing a likelihood that HARQ processes collide. Additionally or alternatively, the UE 210 may further increase transmission flexibility by allocating HARQ IDs in a multi-configured grant environment to mitigate issues related to configured grant timers. Another implementation may provide improved quality and reliability of service at the UE 210, as latency and the number of separate resources allocated to the UE 210 may be reduced. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
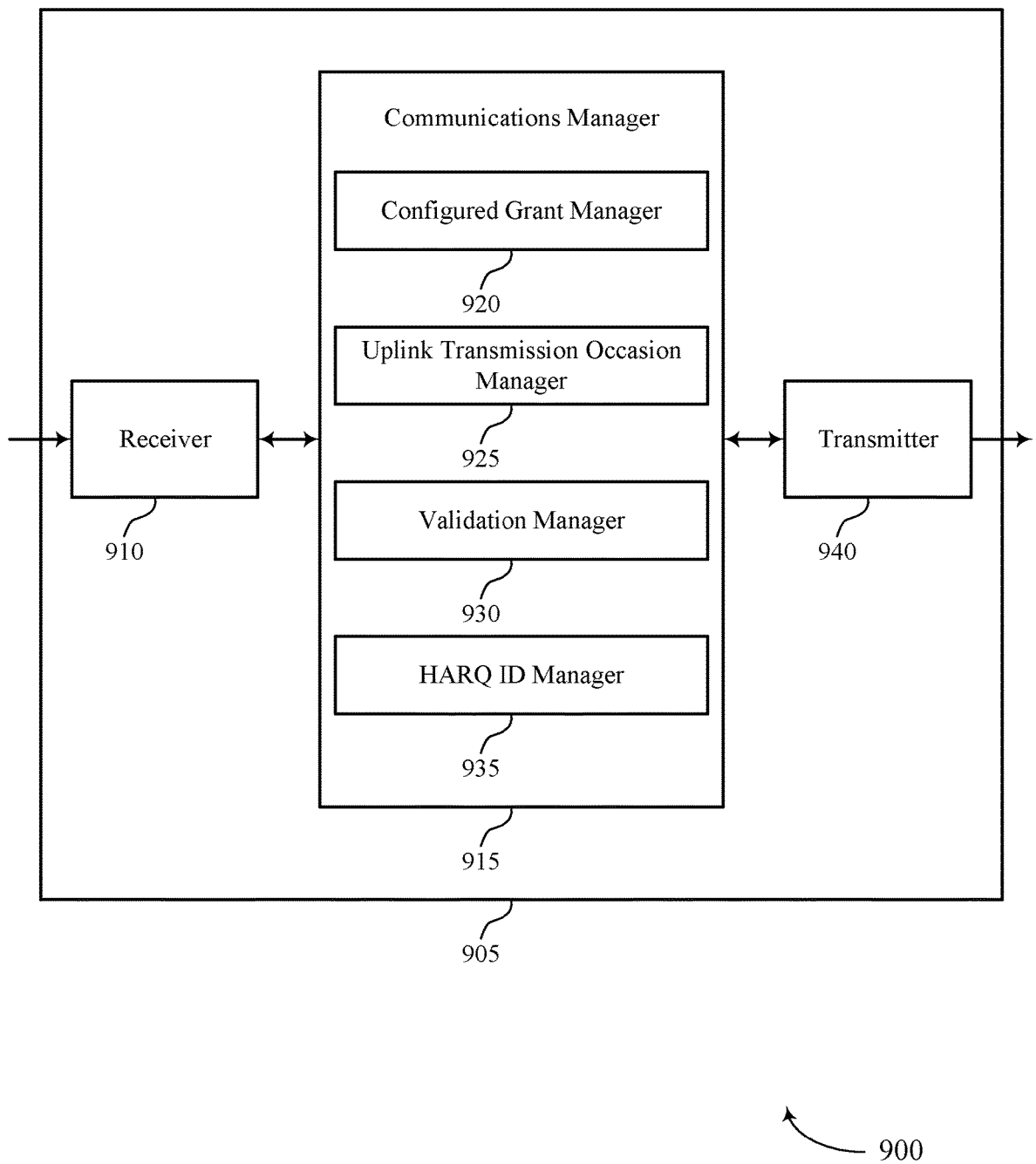

FIG. 9 shows a block diagram 900 of a device 905 that supports validating uplink configured grants in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to validating uplink configured grants). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configured grant manager 920, an uplink transmission occasion manager 925, a validation manager 930, and a HARQ ID manager 935. The communications manager 915 may be an example of aspects of the communications manager 1110 described herein.

In some cases, the configured grant manager 920 may identify a first configured grant actively used by a UE and a second configured grant actively used by the UE. The uplink transmission occasion manager 925 may identify an uplink transmission occasion associated with the first configured grant and perform an uplink transmission during the uplink transmission occasion based on the validation. The validation manager 930 may identify a HARQ ID associated with the uplink transmission occasion and a timer associated with the HARQ ID and validate the uplink transmission occasion based on a status of the timer. The uplink transmission occasion manager 925 may perform an uplink transmission during the uplink transmission occasion based on the validation. Based on identifying a first configured grant actively used by a UE and a second configured grant actively used by the UE, a processor of a UE 210 (e.g., controlling the receiver 910, the transmitter 940, or the transceiver 1120 as described with reference to FIG. 11) may efficiently performing an uplink transmission during the uplink transmission occasion. Further, the processor of UE 210 may identify the timer from a first set of timers associated with the first configured grant based at least in part on the uplink transmission occasion being associated with the first configured grant. The processor of the UE 210 may turn on one or more processing units for identifying the timer, increase a processing clock, or a similar mechanism within the UE 210. As such, when the timer is identified, the processor may be ready to respond more efficiently through the reduction of a ramp up in processing power.

In some cases, the uplink transmission occasion manager 925 may perform an uplink transmission associated with a configured grant and having a first HARQ ID and receive, from a base station, a dynamic grant requesting that the uplink transmission be retransmitted as part of a HARQ process, the dynamic grant including a first indicator of the HARQ ID and a second indicator of the configured grant associated with the uplink transmission. The validation manager 930 may validate the dynamic grant based on the first indicator and the second indicator included in the dynamic grant.

In some cases, the uplink transmission occasion manager 925 may identify a first quantity of uplink transmission occasions associated with a first configured grant and a second quantity of uplink transmission occasions associated with a second configured grant and determine that the first quantity associated with the first configured grant is greater than the second quantity associated with the second configured grant based on identifying the first quantity and the second quantity. The HARQ ID manager 935 may allocate HARQ IDs to a first set of uplink transmission occasions associated with the first configured grant based on determining that the first quantity is greater than the second quantity, identify a relationship parameter between the first set of uplink transmission occasions and a second set of uplink transmission occasions associated with the second configured grant, and allocate HARQ IDs to the second set of uplink transmission occasions based on the identified relationship parameter.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
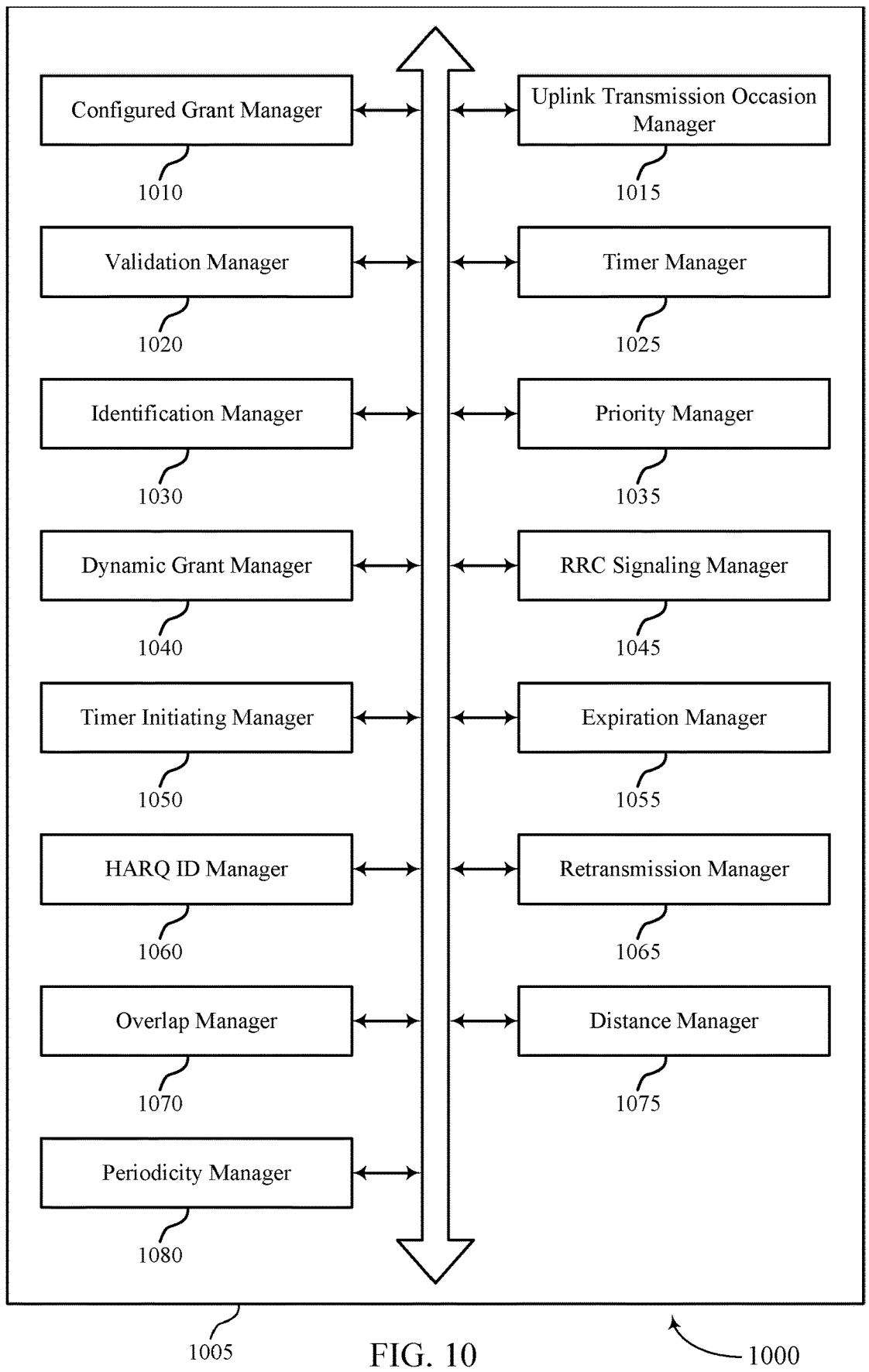
FIG. 10 shows a block diagram of a communications manager that supports validating uplink configured grants in accordance with aspects of the present disclosure.

FIG. 10 shows a block diagram 1000 of a communications manager 1005 that supports validating uplink configured grants in accordance with aspects of the present disclosure. The communications manager 1005 may be an example of aspects of a communications manager 815, a communications manager 915, or a communications manager 1110 described herein. The communications manager 1005 may include a configured grant manager 1010, an uplink transmission occasion manager 1015, a validation manager 1020, a timer manager 1025, an identification manager 1030, a priority manager 1035, a dynamic grant manager 1040, an RRC signaling manager 1045, a timer initiating manager 1050, an expiration manager 1055, a HARQ ID manager 1060, a retransmission manager 1065, an overlap manager 1070, a distance manager 1075, and a periodicity manager 1080. Each of these modules may communicate, directly or indirectly, with one another (e.g., via one or more buses).

The configured grant manager 1010 may identify a first configured grant actively used by a UE and a second configured grant actively used by the UE. In some examples, the configured grant manager 1010 may identify three or more configured grants actively used by the UE, where the three or more configured grants include the first configured grant and the second configured grant.

In some examples, the configured grant manager 1010 may downlink control information includes the second indicator of the configured grant associated with the uplink transmission. In some examples, downlinking control information includes a field that includes the second indicator. In some cases, the first configured grant is associated with a first configured scheduling radio network temporary identifier (CS-RNTI) and the second configured grant is associated with a second CS-RNTI different than the first CS-RNTI.

The uplink transmission occasion manager 1015 may identify an uplink transmission occasion associated with the first configured grant. In some examples, the uplink transmission occasion manager 1015 may perform an uplink transmission during the uplink transmission occasion based on the validation. In some examples, the uplink transmission occasion manager 1015 may perform an uplink transmission associated with a configured grant and having a first HARQ ID.

In some examples, the uplink transmission occasion manager 1015 may receive, from a base station, a dynamic grant requesting that the uplink transmission be retransmitted as part of a HARQ process, the dynamic grant including a first indicator of the HARQ ID and a second indicator of the configured grant associated with the uplink transmission. In some examples, the uplink transmission occasion manager 1015 may identify a first quantity of uplink transmission occasions associated with a first configured grant and a second quantity of uplink transmission occasions associated with a second configured grant. In some examples, the uplink transmission occasion manager 1015 may determine that the first quantity associated with the first configured grant is greater than the second quantity associated with the second configured grant based on identifying the first quantity and the second quantity.

The validation manager 1020 may identify a HARQ ID associated with the uplink transmission occasion and a timer associated with the HARQ ID. In some examples, the validation manager 1020 may validate the uplink transmission occasion based on a status of the timer. In some examples, the validation manager 1020 may validate the dynamic grant based on the first indicator and the second indicator included in the dynamic grant. In some examples, the validation manager 1020 may determine that a value of the timer associated with the HARQ ID of the uplink transmission occasion satisfies a criteria. In some cases, the value of the timer a zero value when the uplink transmission occasion is validated.

The timer manager 1025 may identify the timer from a first set of timers associated with the first configured grant based on the uplink transmission occasion being associated with the first configured grant, where validating the uplink transmission occasion is based on the timer being associated with a same configured grant as the uplink transmission occasion. In some examples, the timer manager 1025 may configure a first set of timers associated with the first configured grant and a second set of timers associated with the second configured grant based on identifying the first configured grant and the second configured grant, where the timer used to validate the uplink transmission occasion is associated with a same configured grant as the uplink transmission occasion.

In some examples, the timer manager 1025 may start the timer associated with the HARQ ID based on performing the uplink transmission. In some cases, the first set of timers includes two or more timers and the second set of timers includes two or more timers. In some cases, the timer is configured to validate uplink transmission occasions that have the HARQ ID and that correspond to a same configured grant as is associated with the timer.

The identification manager 1030 may identify the timer from a set of timers associated with the first configured grant and the second configured grant, where a single timer of the set of timers is configured to track a HARQ process of a single HARQ ID associated with the first configured grant, the second configured grant, or both the first configured grant and the second configured grant. In some cases, the timer is associated with the single HARQ ID independent of whether the single HARQ ID is associated with the first configured grant, the second configured grant, or both the first configured grant and the second configured grant.

The priority manager 1035 may determine that a first service type of traffic communicated using the first configured grant has a lower priority than a second service type of traffic communicated using the second configured grant, where validating the uplink transmission occasion is based on determining that the first service type has the lower priority than the second service type. In some examples, the priority manager 1035 may determine that a second timer for the HARQ ID and associated with the second configured grant is expired, where validating the uplink transmission occasion is based on determining that the second timer is expired. In some cases, the timer is associated with the first configured grant.

The dynamic grant manager 1040 may perform a dynamic uplink transmission, where validating the uplink transmission occasion is based on the timer being associated with the dynamic uplink transmission. In some examples, determining that a first service type of traffic communicated using the first configured grant has a higher priority than a second service type of traffic communicated using a dynamic grant, where validating the uplink transmission occasion further includes ignoring the timer associated with lower priority dynamic grant. In some examples, the dynamic grant manager 1040 may identify an error case based on determining that the first service type of the first configured grant has the higher priority than the second service type of the dynamic grant.

The RRC signaling manager 1045 may receive a first message including the first configured grant and the second configured grant, where identifying the first configured grant and the second configured grant is based on receiving the first message. In some cases, the first message includes a radio resource control message.

The timer initiating manager 1050 may determine that the uplink transmission has a higher priority than traffic associated with the second configured grant. In some examples, the timer initiating manager 1050 may start the timer associated with the HARQ ID and the first configured grant. In some examples, the timer initiating manager 1050 may start a second timer associated with the HARQ ID and the second configured grant.

In some examples, the timer initiating manager 1050 may start the timer based on performing a second uplink transmission as part of a HARQ process. In some examples, the timer initiating manager 1050 may monitor for a dynamic grant from a base station until the timer expires. In some examples, the timer initiating manager 1050 may determine that the second uplink transmission is successfully received based on the timer expiring without receiving the dynamic grant.

The expiration manager 1055 may determine that the timer expires. In some examples, the expiration manager 1055 may determine that a second uplink transmission is successfully received by a base station based on determining that the timer expires, where validating the uplink transmission occasion is based on determining that the timer expires.

The HARQ ID manager 1060 may allocate HARQ IDs to a first set of uplink transmission occasions associated with the first configured grant based on determining that the first quantity is greater than the second quantity. In some examples, the HARQ ID manager 1060 may identify a relationship parameter between the first set of uplink transmission occasions and a second set of uplink transmission occasions associated with the second configured grant. In some examples, the HARQ ID manager 1060 may allocate HARQ IDs to the second set of uplink transmission occasions based on the identified relationship parameter. In some examples, the HARQ ID manager 1060 may identify a first symbol of the uplink transmission occasion, where identifying the HARQ ID associated with the uplink transmission occasion is based on identifying the first symbol of the uplink transmission occasion.

The retransmission manager 1065 may perform a retransmission of the uplink transmission based on validating the dynamic grant based at least in part on validating the dynamic grant. In some examples, the retransmission manager 1065 may restart a timer based on performing the retransmission. In some examples, the retransmission manager 1065 may identify communication resources for retransmitting the uplink transmission based on receiving the dynamic grant, where performing the retransmission is based on identifying the communication resources. In some examples, the retransmission manager 1065 may discard the dynamic grant based on the dynamic grant failing to be validated.

The overlap manager 1070 may determine that a first uplink transmission occasion of the second set overlaps in time resources with a second uplink transmission occasion of the first set. In some examples, identifying a first HARQ ID of the second uplink transmission occasion, where allocating the HARQ IDs to the second set further includes allocating the first HARQ ID to the first uplink transmission occasion based on determining that the second uplink transmission occasion overlaps with the first uplink transmission occasion. In some examples, the overlap manager 1070 may determine that the first uplink transmission occasion of the second set does not overlap in time resources with the second uplink transmission occasion of the first set, where identifying the periodic distance is based on determining that the first uplink transmission occasion does not overlap with the second uplink transmission occasion.

The distance manager 1075 may identify a periodic distance between a first uplink transmission occasion of the second set and each uplink transmission occasion of the first set. In some examples, identifying a first HARQ ID of a second uplink transmission occasion of the first set that has a maximum periodic distance from the first uplink transmission occasion of the second set, where allocating the HARQ IDs to the second set further includes allocating the first HARQ ID to the first uplink transmission occasion based on first uplink transmission having the maximum periodic distance from the first uplink transmission occasion. In some examples, the distance manager 1075 may identify a minimum periodic distance between uplink transmission occasions having a same HARQ ID. In some examples, the distance manager 1075 may determine a timer duration based on the minimum periodic distance between the uplink transmission occasions having the same HARQ ID.

The periodicity manager 1080 may identify a first periodicity of the first set of uplink transmission occasions of the first configured grant and a second periodicity of the second set of uplink transmission occasions of the second configured grant, where allocating the HARQ IDs to the first set and the second set is based on identifying the first periodicity and the second periodicity.

Figure 11:
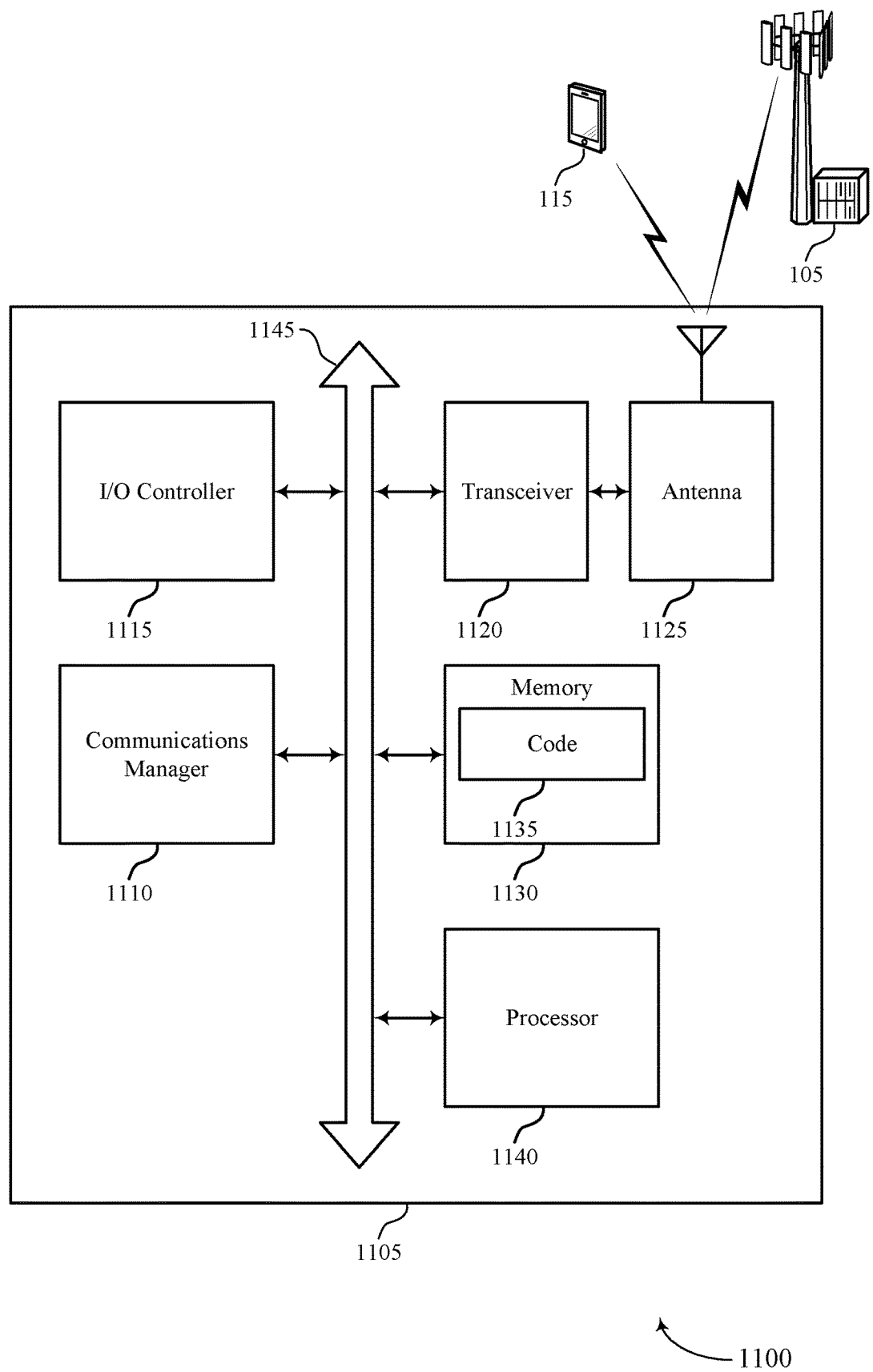
FIG. 11 shows a diagram of a system including a device that supports validating uplink configured grants in accordance with aspects of the present disclosure.

FIG. 11 shows a diagram of a system 1100 including a device 1105 that supports validating uplink configured grants in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a first configured grant actively used by a UE and a second configured grant actively used by the UE, identify an uplink transmission occasion associated with the first configured grant, perform an uplink transmission during the uplink transmission occasion based on the validation, identify a HARQ ID associated with the uplink transmission occasion and a timer associated with the HARQ ID, and validate the uplink transmission occasion based on a status of the timer. The communications manager 1110 may also perform an uplink transmission associated with a configured grant and having a first HARQ ID, receive, from a base station, a dynamic grant requesting that the uplink transmission be retransmitted as part of a HARQ process, the dynamic grant including a first indicator of the HARQ ID and a second indicator of the configured grant associated with the uplink transmission, and validate the dynamic grant based on the first indicator and the second indicator included in the dynamic grant. The communications manager 1110 may also identify a first quantity of uplink transmission occasions associated with a first configured grant and a second quantity of uplink transmission occasions associated with a second configured grant, determine that the first quantity associated with the first configured grant is greater than the second quantity associated with the second configured grant based on identifying the first quantity and the second quantity, allocate HARQ IDs to a first set of uplink transmission occasions associated with the first configured grant based on determining that the first quantity is greater than the second quantity, identify a relationship parameter between the first set of uplink transmission occasions and a second set of uplink transmission occasions associated with the second configured grant, and allocate HARQ IDs to the second set of uplink transmission occasions based on the identified relationship parameter.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting validating uplink configured grants).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
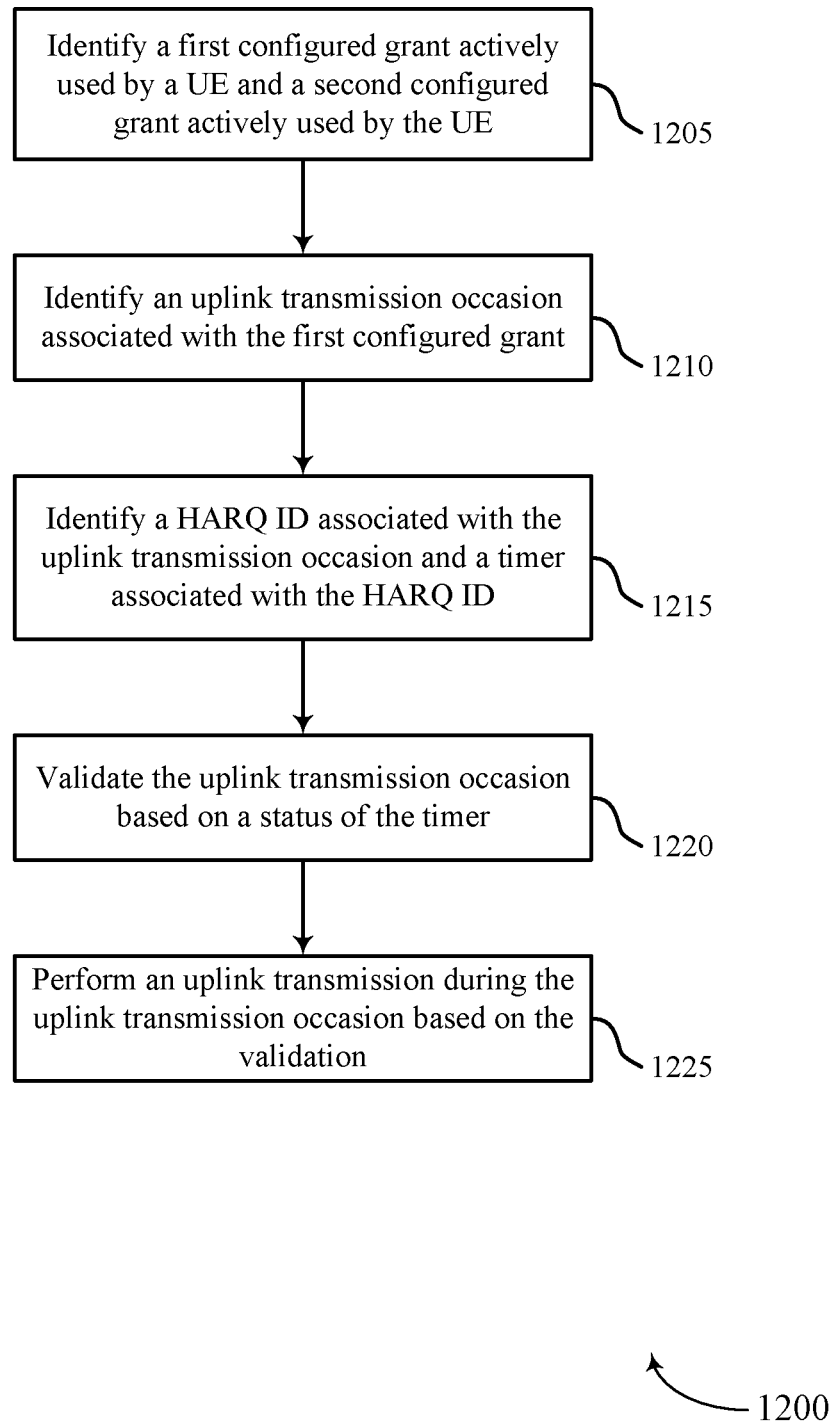
FIGS. 12 through 16 show flowcharts illustrating methods that support validating uplink configured grants in accordance with aspects of the present disclosure.

FIG. 12 shows a flowchart illustrating a method 1200 that supports validating uplink configured grants in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may identify a first configured grant actively used by a UE and a second configured grant actively used by the UE. The operations of 1205 may be performed according to the methods described herein. In some examples, aspects of the operations of 1205 may be performed by a configured grant manager as described with reference to FIGS. 8 through 11.

At 1210, the UE may identify an uplink transmission occasion associated with the first configured grant. The operations of 1210 may be performed according to the methods described herein. In some examples, aspects of the operations of 1210 may be performed by an uplink transmission occasion manager as described with reference to FIGS. 8 through 11.

At 1215, the UE may identify a HARQ ID associated with the uplink transmission occasion and a timer associated with the HARQ ID. The operations of 1215 may be performed according to the methods described herein. In some examples, aspects of the operations of 1215 may be performed by a validation manager as described with reference to FIGS. 8 through 11.

At 1220, the UE may validate the uplink transmission occasion based on a status of the timer. The operations of 1220 may be performed according to the methods described herein. In some examples, aspects of the operations of 1220 may be performed by a validation manager as described with reference to FIGS. 8 through 11.

At 1225, the UE may perform an uplink transmission during the uplink transmission occasion based on the validation. The operations of 1225 may be performed according to the methods described herein. In some examples, aspects of the operations of 1225 may be performed by an uplink transmission occasion manager as described with reference to FIGS. 8 through 11.

Figure 13:
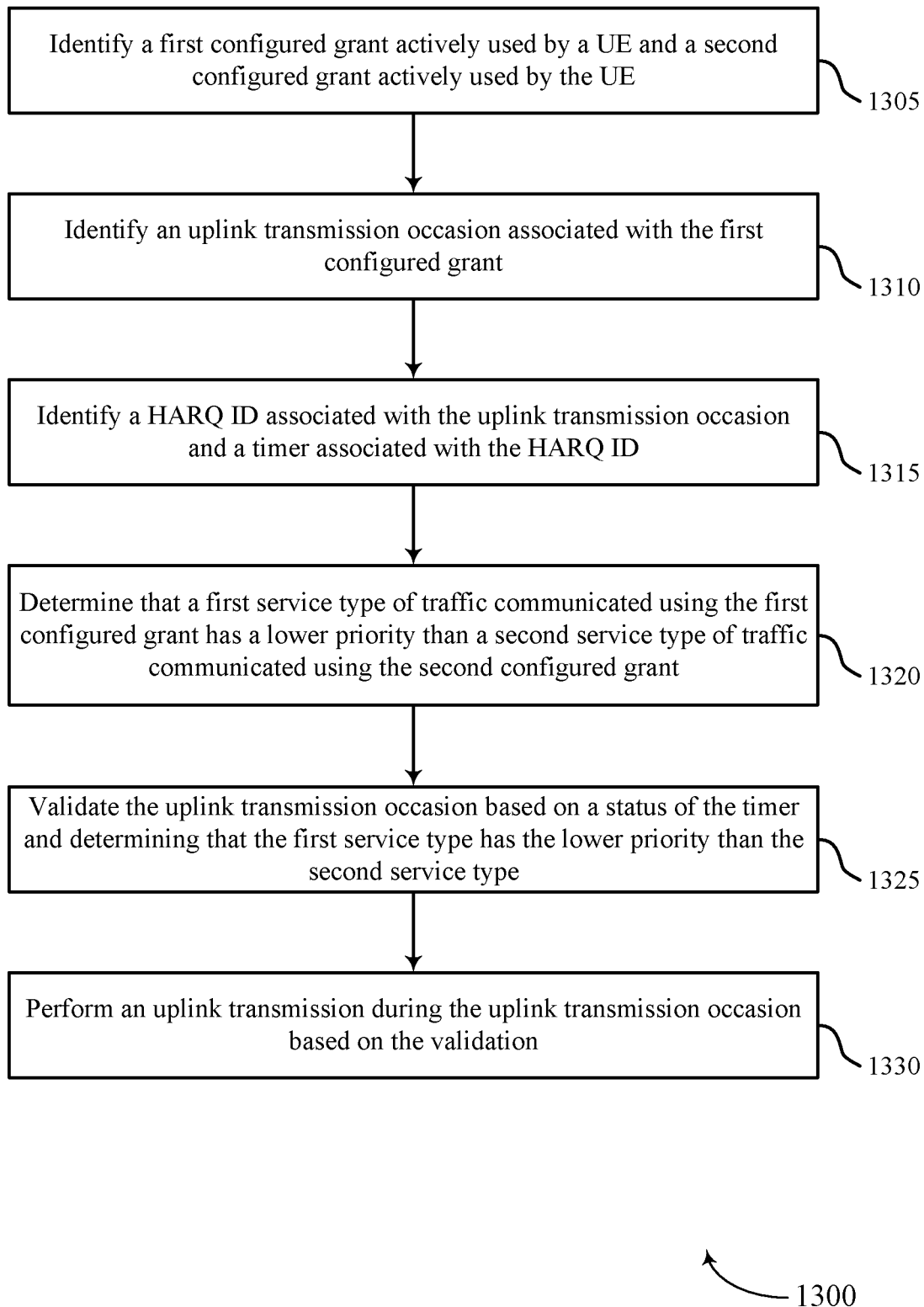

FIG. 13 shows a flowchart illustrating a method 1300 that supports validating uplink configured grants in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may identify a first configured grant actively used by a UE and a second configured grant actively used by the UE. The operations of 1305 may be performed according to the methods described herein. In some examples, aspects of the operations of 1305 may be performed by a configured grant manager as described with reference to FIGS. 8 through 11.

At 1310, the UE may identify an uplink transmission occasion associated with the first configured grant. The operations of 1310 may be performed according to the methods described herein. In some examples, aspects of the operations of 1310 may be performed by an uplink transmission occasion manager as described with reference to FIGS. 8 through 11.

At 1315, the UE may identify a HARQ ID associated with the uplink transmission occasion and a timer associated with the HARQ ID. The operations of 1315 may be performed according to the methods described herein. In some examples, aspects of the operations of 1315 may be performed by a validation manager as described with reference to FIGS. 8 through 11.

At 1320, the UE may determine that a first service type of traffic communicated using the first configured grant has a lower priority than a second service type of traffic communicated using the second configured grant. The operations of 1320 may be performed according to the methods described herein. In some examples, aspects of the operations of 1320 may be performed by a priority manager as described with reference to FIGS. 8 through 11.

At 1325, the UE may validate the uplink transmission occasion based on a status of the timer and determining that the first service type has the lower priority than the second service type. The operations of 1325 may be performed according to the methods described herein. In some examples, aspects of the operations of 1325 may be performed by a validation manager as described with reference to FIGS. 8 through 11.

At 1330, the UE may perform an uplink transmission during the uplink transmission occasion based on the validation. The operations of 1330 may be performed according to the methods described herein. In some examples, aspects of the operations of 1330 may be performed by an uplink transmission occasion manager as described with reference to FIGS. 8 through 11.

Figure 14:
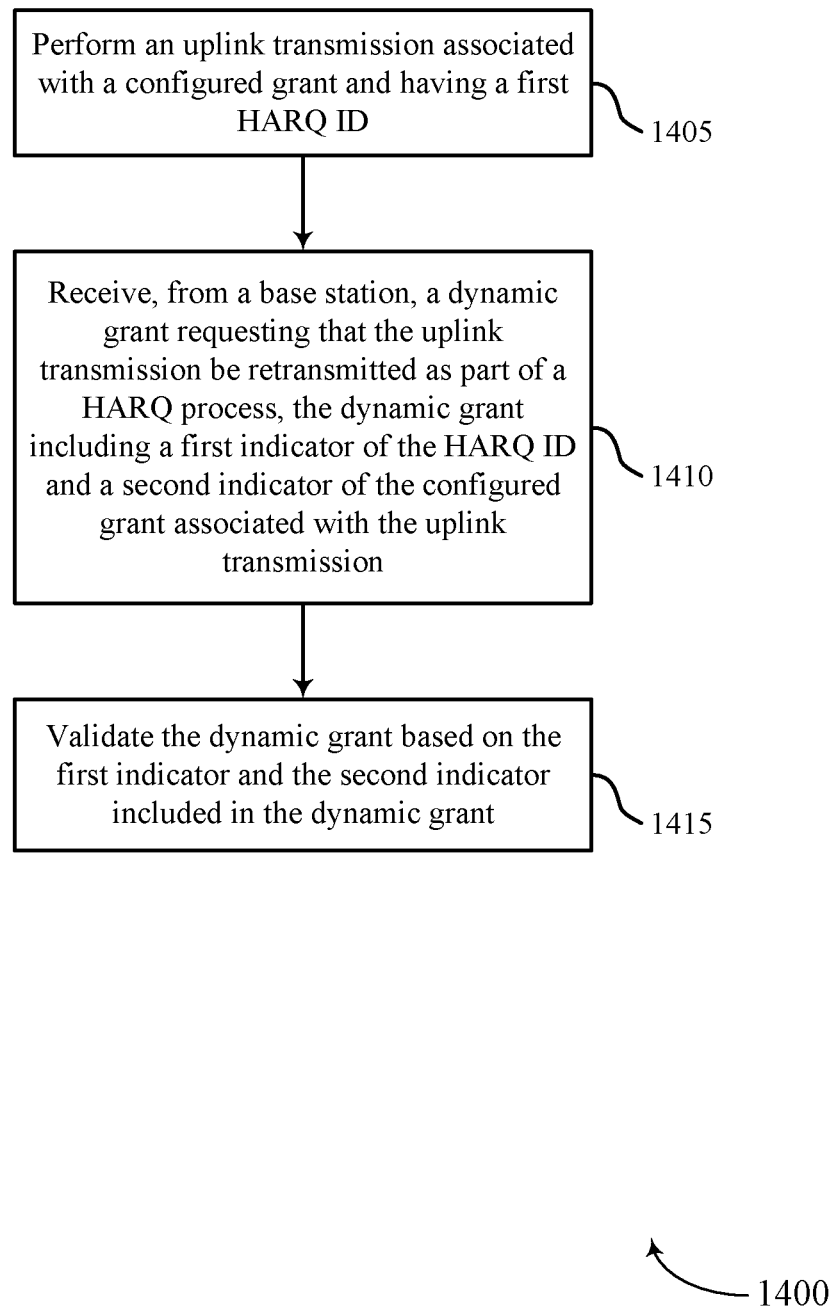

FIG. 14 shows a flowchart illustrating a method 1400 that supports validating uplink configured grants in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may perform an uplink transmission associated with a configured grant and having a first HARQ ID. The operations of 1405 may be performed according to the methods described herein. In some examples, aspects of the operations of 1405 may be performed by an uplink transmission occasion manager as described with reference to FIGS. 8 through 11.

At 1410, the UE may receive, from a base station, a dynamic grant requesting that the uplink transmission be retransmitted as part of a HARQ process, the dynamic grant including a first indicator of the HARQ ID and a second indicator of the configured grant associated with the uplink transmission. The operations of 1410 may be performed according to the methods described herein. In some examples, aspects of the operations of 1410 may be performed by an uplink transmission occasion manager as described with reference to FIGS. 8 through 11.

At 1415, the UE may validate the dynamic grant based on the first indicator and the second indicator included in the dynamic grant. The operations of 1415 may be performed according to the methods described herein. In some examples, aspects of the operations of 1415 may be performed by a validation manager as described with reference to FIGS. 8 through 11.

Figure 15:
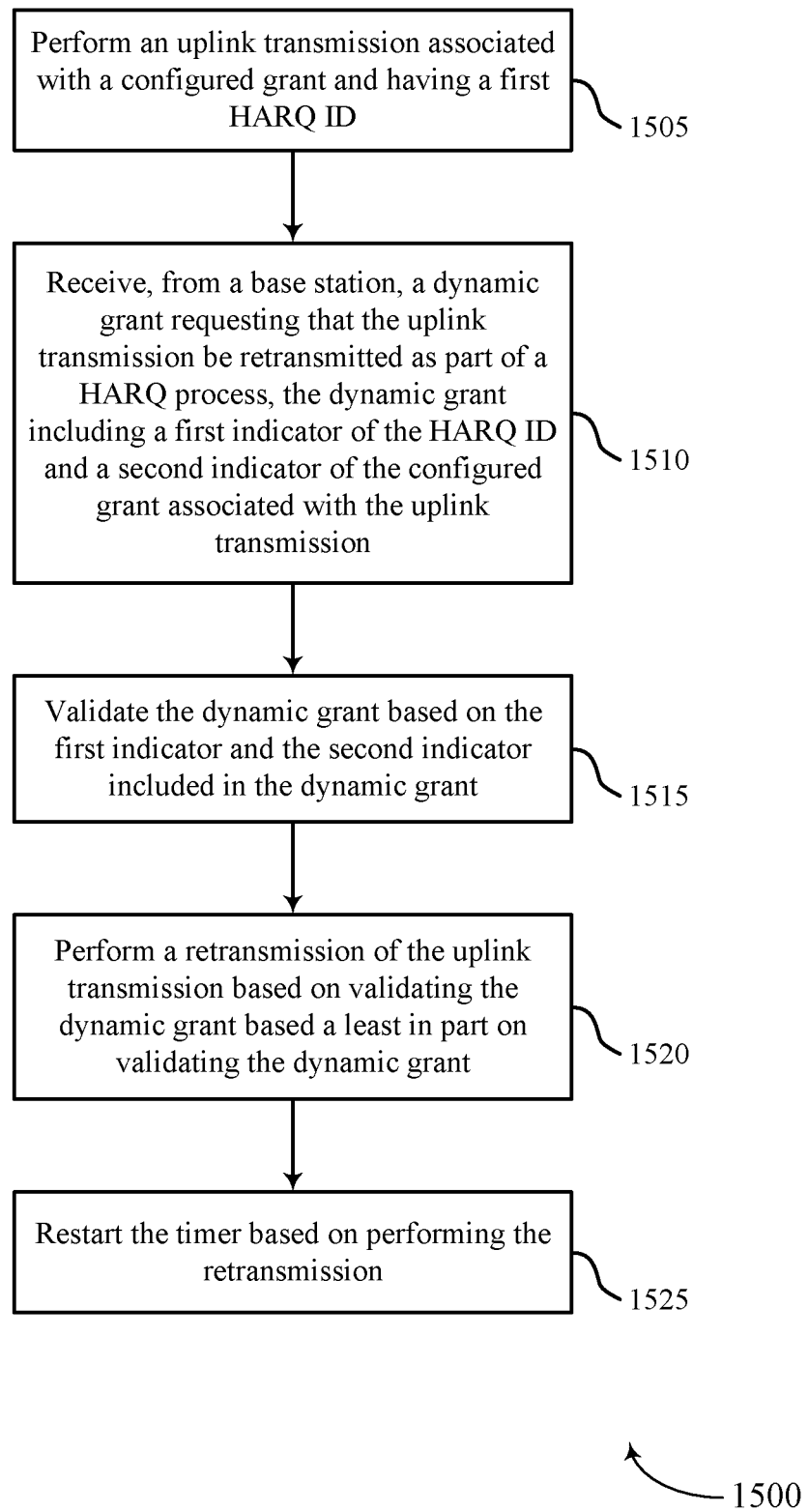

FIG. 15 shows a flowchart illustrating a method 1500 that supports validating uplink configured grants in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1505, the UE may perform an uplink transmission associated with a configured grant and having a first HARQ ID. The operations of 1505 may be performed according to the methods described herein. In some examples, aspects of the operations of 1505 may be performed by an uplink transmission occasion manager as described with reference to FIGS. 8 through 11.

At 1510, the UE may receive, from a base station, a dynamic grant requesting that the uplink transmission be retransmitted as part of a HARQ process, the dynamic grant including a first indicator of the HARQ ID and a second indicator of the configured grant associated with the uplink transmission. The operations of 1510 may be performed according to the methods described herein. In some examples, aspects of the operations of 1510 may be performed by an uplink transmission occasion manager as described with reference to FIGS. 8 through 11.

At 1515, the UE may validate the dynamic grant based on the first indicator and the second indicator included in the dynamic grant. The operations of 1515 may be performed according to the methods described herein. In some examples, aspects of the operations of 1515 may be performed by a validation manager as described with reference to FIGS. 8 through 11.

At 1520, the UE may perform a retransmission of the uplink transmission based on validating the dynamic grant based at least in part on validating the dynamic grant. The operations of 1520 may be performed according to the methods described herein. In some examples, aspects of the operations of 1520 may be performed by a retransmission manager as described with reference to FIGS. 8 through 11.

At 1525, the UE may restart a timer based on performing the retransmission. The operations of 1525 may be performed according to the methods described herein. In some examples, aspects of the operations of 1525 may be performed by a retransmission manager as described with reference to FIGS. 8 through 11.

Figure 16:
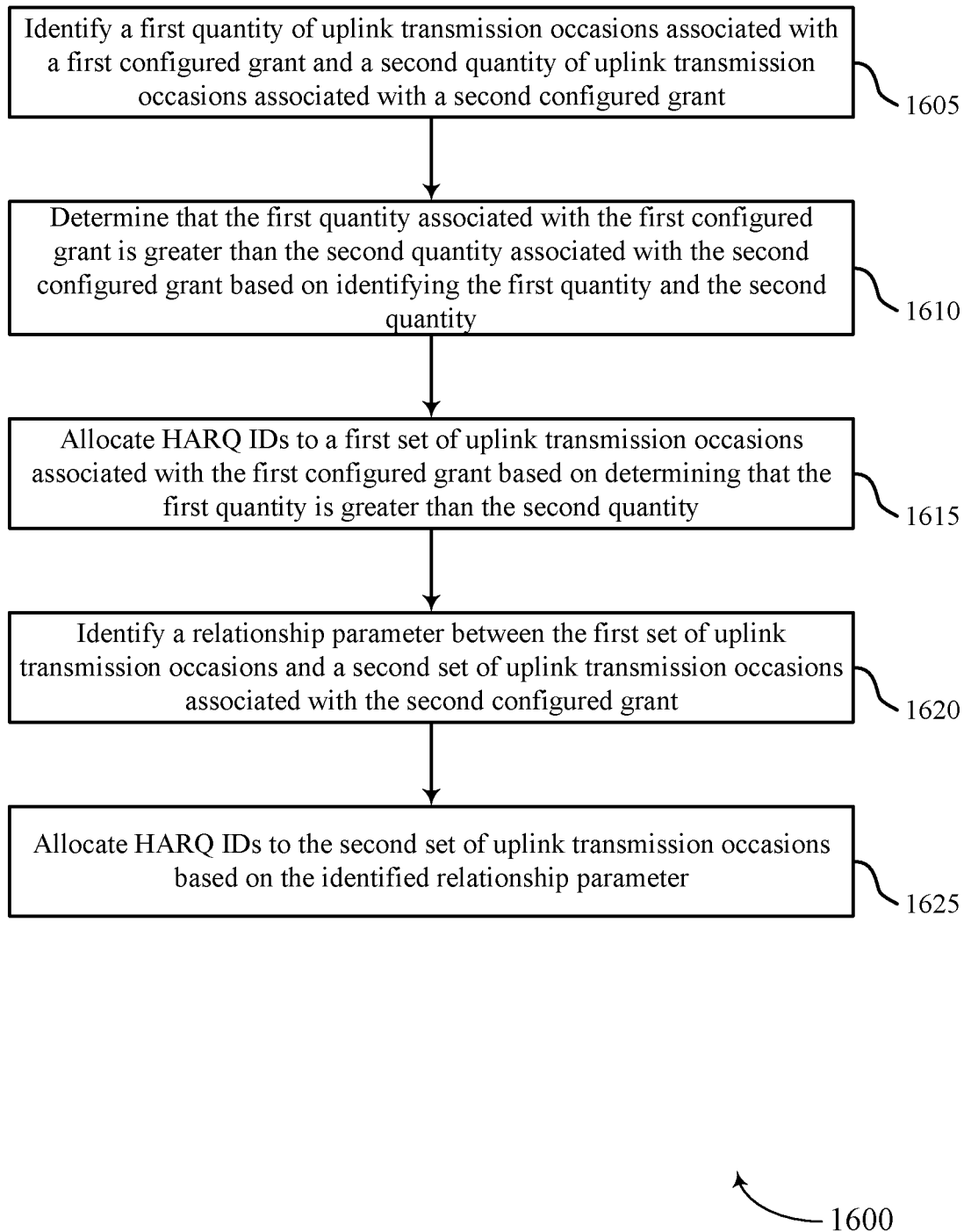

FIG. 16 shows a flowchart illustrating a method 1600 that supports validating uplink configured grants in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a first quantity of uplink transmission occasions associated with a first configured grant and a second quantity of uplink transmission occasions associated with a second configured grant. The operations of 1605 may be performed according to the methods described herein. In some examples, aspects of the operations of 1605 may be performed by an uplink transmission occasion manager as described with reference to FIGS. 8 through 11.

At 1610, the UE may determine that the first quantity associated with the first configured grant is greater than the second quantity associated with the second configured grant based on identifying the first quantity and the second quantity. The operations of 1610 may be performed according to the methods described herein. In some examples, aspects of the operations of 1610 may be performed by an uplink transmission occasion manager as described with reference to FIGS. 8 through 11.

At 1615, the UE may allocate HARQ IDs to a first set of uplink transmission occasions associated with the first configured grant based on determining that the first quantity is greater than the second quantity. The operations of 1615 may be performed according to the methods described herein. In some examples, aspects of the operations of 1615 may be performed by a HARQ ID manager as described with reference to FIGS. 8 through 11.

At 1620, the UE may identify a relationship parameter between the first set of uplink transmission occasions and a second set of uplink transmission occasions associated with the second configured grant. The operations of 1620 may be performed according to the methods described herein. In some examples, aspects of the operations of 1620 may be performed by a HARQ ID manager as described with reference to FIGS. 8 through 11.

At 1625, the UE may allocate HARQ IDs to the second set of uplink transmission occasions based on the identified relationship parameter. The operations of 1625 may be performed according to the methods described herein. In some examples, aspects of the operations of 1625 may be performed by a HARQ ID manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first configured grant actively used by a user equipment (UE) and a second configured grant actively used by the UE;
   configuring a first plurality of timers associated with the first configured grant and a second plurality of timers associated with the second configured grant based at least in part on identifying the first configured grant and the second configured grant, wherein the first plurality of timers is different than the second plurality of timers;
   identifying an uplink transmission occasion associated with the first configured grant;
   identifying a hybrid automatic repeat request (HARQ) identifier (ID) associated with the uplink transmission occasion and a timer associated with the HARQ ID, wherein the timer is one of the first plurality of timers;
   validating the uplink transmission occasion based at least in part on a status of the timer; and
   performing an uplink transmission during the uplink transmission occasion based at least in part on the validation.

2. The method of claim 1, further comprising:
   identifying the timer from the first plurality of timers associated with the first configured grant based at least in part on the uplink transmission occasion being associated with the first configured grant, wherein validating the uplink transmission occasion is based at least in part on the timer being associated with a same configured grant as the uplink transmission occasion.

3. The method of claim 1, wherein the timer used to validate the uplink transmission occasion is associated with a same configured grant as the uplink transmission occasion.

4. The method of claim 1, wherein the first plurality of timers comprises two or more timers and the second plurality of timers comprises two or more timers.

5. The method of claim 1, wherein the timer is configured to validate uplink transmission occasions that have the HARQ ID and that correspond to a same configured grant as is associated with the timer.

6. The method of claim 1, further comprising:
   identifying the timer from a set of timers associated with the first configured grant and the second configured grant, wherein a single timer of the set of timers is configured to track a HARQ process of a single HARQ ID associated with the first configured grant, the second configured grant, or both the first configured grant and the second configured grant.

7. The method of claim 6, wherein the timer is associated with the single HARQ ID independent of whether the single HARQ ID is associated with the first configured grant, the second configured grant, or both the first configured grant and the second configured grant.

8. The method of claim 1, further comprising:
   determining that a first service type of traffic communicated using the first configured grant has a lower priority than a second service type of traffic communicated using the second configured grant, wherein validating the uplink transmission occasion is based at least in part on determining that the first service type has the lower priority than the second service type.

9. The method of claim 8, further comprising:
   determining that a second timer for the HARQ ID and associated with the second configured grant is expired, wherein validating the uplink transmission occasion is based at least in part on determining that the second timer is expired.

10. The method of claim 9, wherein the timer is associated with the first configured grant.

11. The method of claim 1, further comprising:
    performing a dynamic uplink transmission, wherein validating the uplink transmission occasion is based at least in part on the timer being associated with the dynamic uplink transmission.

12. The method of claim 1, further comprising:
    determining that a first service type of traffic communicated using the first configured grant has a higher priority than a second service type of traffic communicated using a dynamic grant, wherein validating the uplink transmission occasion further comprises ignoring the timer associated with lower priority dynamic grant.

13. The method of claim 12, further comprising:
identifying an error case based at least in part on determining that the first service type of the first configured grant has the higher priority than the second service type of the dynamic grant.

14. The method of claim 1, further comprising:
starting the timer associated with the HARQ ID based at least in part on performing the uplink transmission.

15. The method of claim 1, further comprising:
receiving a first message comprising the first configured grant and the second configured grant, wherein identifying the first configured grant and the second configured grant is based at least in part on receiving the first message.

16. The method of claim 15, wherein the first message comprises a radio resource control message.

17. The method of claim 1, further comprising:
determining that the uplink transmission has a higher priority than traffic associated with the second configured grant;
starting the timer associated with the HARQ ID and the first configured grant; and
starting a second timer associated with the HARQ ID and the second configured grant.

18. The method of claim 1, wherein validating the uplink transmission occasion further comprises:
determining that a value of the timer associated with the HARQ ID of the uplink transmission occasion satisfies a criteria.

19. The method of claim 18, wherein the value of the timer comprises a zero value when the uplink transmission occasion is validated.

20. The method of claim 1, further comprising:
starting the timer based at least in part on performing a second uplink transmission as part of a HARQ process;
monitoring for a dynamic grant from a base station until the timer expires; and
determining that the second uplink transmission is successfully received based at least in part on the timer expiring without receiving the dynamic grant.

21. The method of claim 1, further comprising:
determining that the timer expires; and
determining that a second uplink transmission is successfully received by a base station based at least in part on determining that the timer expires, wherein validating the uplink transmission occasion is based at least in part on determining that the timer expires.

22. The method of claim 1, further comprising:
identifying three or more configured grants actively used by the UE, wherein the three or more configured grants comprise the first configured grant and the second configured grant.

23. The method of claim 1, wherein the first configured grant is associated with a first configured scheduling radio network temporary identifier (CS-RNTI) and the second configured grant is associated with a second CS-RNTI different than the first CS-RNTI.

24. The method of claim 1, further comprising:
identifying a first symbol of the uplink transmission occasion, wherein identifying the HARQ ID associated with the uplink transmission occasion is based at least in part on identifying the first symbol of the uplink transmission occasion.

25. A method for wireless communication, comprising:
performing an uplink transmission associated with a configured grant and having a first hybrid automatic repeat request (HARQ) identifier (ID);
receiving, from a base station, a dynamic grant requesting that the uplink transmission be retransmitted as part of a HARQ process, the dynamic grant comprising a first indicator of the first HARQ ID and a second indicator of a configured grant index of the configured grant associated with the uplink transmission; and
validating the dynamic grant based at least in part on the first indicator and the second indicator included in the dynamic grant.

26. The method of claim 25, further comprising:
performing a retransmission of the uplink transmission based at least in part on validating the dynamic grant based at least in part on validating the dynamic grant;
restarting a timer based at least in part on performing the retransmission; and
identifying communication resources for retransmitting the uplink transmission based at least in part on receiving the dynamic grant, wherein performing the retransmission is based at least in part on identifying the communication resources.

27. A method for wireless communication, comprising:
identifying a first quantity of uplink transmission occasions associated with a first configured grant and a second quantity of uplink transmission occasions associated with a second configured grant;
determining that the first quantity associated with the first configured grant is greater than the second quantity associated with the second configured grant based at least in part on identifying the first quantity and the second quantity;
allocating hybrid automatic repeat request (HARQ) identifiers (IDs) to a first set of uplink transmission occasions associated with the first configured grant based at least in part on determining that the first quantity is greater than the second quantity;
identifying a relationship parameter between the first set of uplink transmission occasions and a second set of uplink transmission occasions associated with the second configured grant; and
allocating HARQ IDs to the second set of uplink transmission occasions based at least in part on the identified relationship parameter.

28. The method of claim 27, wherein identifying the relationship parameter further comprises:
determining that a first uplink transmission occasion of the second set overlaps in time resources with a second uplink transmission occasion of the first set; and
identifying a first HARQ ID of the second uplink transmission occasion, wherein allocating the HARQ IDs to the second set further comprises allocating the first HARQ ID to the first uplink transmission occasion based at least in part on determining that the second uplink transmission occasion overlaps with the first uplink transmission occasion.

29. The method of claim 27, wherein identifying the relationship parameter further comprises:
identifying a periodic distance between a first uplink transmission occasion of the second set and each uplink transmission occasion of the first set;
identifying a first HARQ ID of a second uplink transmission occasion of the first set that has a maximum periodic distance from the first uplink transmission occasion of the second set, wherein allocating the HARQ IDs to the second set further comprises allocating the first HARQ ID to the first uplink transmission occasion based at least in part on first uplink transmission having the maximum periodic distance from the first uplink transmission occasion; and determining that the first uplink transmission occasion of the second set does not overlap in time resources with the second uplink transmission occasion of the first set, wherein identifying the periodic distance is based at least in part on determining that the first uplink transmission occasion does not overlap with the second uplink transmission occasion.

30. An apparatus for wireless communication, comprising: a processor, memory in electronic communication with the processor; and instructions stored in the memory and executable by the processor to cause the apparatus to:

identify a first configured grant actively used by a user equipment (UE) and a second configured grant actively used by the UE;

configure a first plurality of timers associated with the first configured grant and a second plurality of timers associated with the second configured grant based at least in part on identifying the first configured grant and the second configured grant, wherein the first plurality of timers is different than the second plurality of timers;

identify an uplink transmission occasion associated with the first configured grant;

identify a hybrid automatic repeat request (HARQ) identifier (ID) associated with the uplink transmission occasion and a timer associated with the HARQ ID, wherein the timer is one of the first plurality of timers or the second plurality of timers;

validate the uplink transmission occasion based at least in part on a status of the timer; and perform an uplink transmission during the uplink transmission occasion based at least in part on the validation.

* * * * *